(12) United States Patent
Pennington et al.

(10) Patent No.: US 9,292,149 B2
(45) Date of Patent: Mar. 22, 2016

(54) METHOD AND APPARATUS FOR PUBLIC COMPUTING

(75) Inventors: Robert Sanford Havoc Pennington, Asheville, NC (US); Aaron Tang, Somerville, MA (US); John Chuang, Brookline, MA (US); Christopher Bambacus, Framingham, MA (US); Eben Eliason, Providence, RI (US); Chris Moody, Boulder, CO (US); Johan Bilien, Somerville, MA (US)

(73) Assignee: LITL LLC, Boston, MA (US)

( * ) Notice: Subject to any disclaimer, the term of this patent is extended or adjusted under 35 U.S.C. 154(b) by 683 days.

(21) Appl. No.: 13/277,634

(22) Filed: Oct. 20, 2011

(65) Prior Publication Data

US 2012/0240060 A1  Sep. 20, 2012

Related U.S. Application Data

(60) Provisional application No. 61/405,861, filed on Oct. 22, 2010.

(51) Int. Cl.
| | |
|---|---|
| *G06F 3/048* | (2013.01) |
| *H04L 29/08* | (2006.01) |
| *G06Q 50/12* | (2012.01) |
| *G06F 1/16* | (2006.01) |
| *G06Q 30/02* | (2012.01) |
| *G06F 9/445* | (2006.01) |

(52) U.S. Cl.
CPC .............. *G06F 3/048* (2013.01); *G06F 1/1618* (2013.01); *G06Q 50/12* (2013.01); *H04L 67/32* (2013.01); *G06F 9/44505* (2013.01); *G06F 2209/5016* (2013.01); *G06Q 30/02* (2013.01)

(58) Field of Classification Search
CPC ....... G06F 21/53; G06F 3/048; G06F 3/0481; G06F 3/04812; G06F 9/4443; G06F 9/4445; G06F 3/04817; G06F 21/32; G06F 2221/2149; H04L 67/306; H04M 2203/6045
USPC ......... 715/733, 735, 737, 750, 753, 760, 808, 715/838, 863, 864; 705/14.37, 14.51, 705/14.58, 15
See application file for complete search history.

(56) References Cited

U.S. PATENT DOCUMENTS

| | | | | |
|---|---|---|---|---|
| 6,486,892 | B1 * | 11/2002 | Stern ............................. | 715/760 |
| 6,791,530 | B2 * | 9/2004 | Vernier et al. ................ | 345/156 |
| 7,116,438 | B2 * | 10/2006 | Maeoka et al. .............. | 358/1.15 |
| 7,136,874 | B2 * | 11/2006 | Mercer et al. ................. | 707/693 |
| 7,526,762 | B1 * | 4/2009 | Astala et al. .................. | 717/171 |

(Continued)

*Primary Examiner* — Nicholas Ulrich
(74) *Attorney, Agent, or Firm* — Wolf, Greenfield & Sacks, P.C.

(57) ABSTRACT

Provided are systems and methods for configuring a portable computer for transient use by a plurality of guests at a selected location. According to some embodiments, the system and methods include displaying a first selection of content on a display screen of the portable computer, initiating a first session responsive to a first guest accessing the portable computer via a user interface of the portable computer, creating a first guest profile responsive to the first session being initiated, displaying a second selection of content on the display screen during the first session, the second selection of content comprising more available content than the first selection of content, terminating the first session responsive to one of a termination action taken by the first guest and expiration of a time-out period, and erasing history of the first session on the portable computer responsive to termination of the first session.

20 Claims, 13 Drawing Sheets

(56) References Cited

U.S. PATENT DOCUMENTS

| | | | |
|---|---|---|---|
| 7,765,481 B2* | 7/2010 | Dixon et al. | 715/738 |
| 8,205,072 B1* | 6/2012 | Gentil et al. | 713/153 |
| 8,307,456 B2* | 11/2012 | Walsh et al. | 726/28 |
| 8,560,709 B1* | 10/2013 | Shokhor et al. | 709/229 |
| 2002/0098849 A1 | 7/2002 | Bloebaum et al. | |
| 2003/0061077 A1* | 3/2003 | Sagar | G06Q 10/02 705/5 |
| 2003/0195963 A1* | 10/2003 | Song et al. | 709/227 |
| 2004/0034537 A1* | 2/2004 | Gengarella | G06Q 30/02 705/5 |
| 2004/0143738 A1* | 7/2004 | Savage et al. | 713/168 |
| 2005/0183021 A1* | 8/2005 | Allen et al. | 715/747 |
| 2007/0027895 A1* | 2/2007 | Bridges et al. | 707/102 |
| 2007/0111726 A1* | 5/2007 | Lambert et al. | 455/432.1 |
| 2007/0117623 A1 | 5/2007 | Nelson et al. | |
| 2007/0192183 A1 | 8/2007 | Monaco et al. | |
| 2007/0204308 A1* | 8/2007 | Nicholas et al. | 725/86 |
| 2007/0233880 A1* | 10/2007 | Nieh et al. | 709/227 |
| 2007/0240076 A1* | 10/2007 | Astala et al. | 715/800 |
| 2007/0260990 A1* | 11/2007 | Evans et al. | 715/750 |
| 2008/0004953 A1* | 1/2008 | Ma et al. | 705/14 |
| 2008/0046298 A1 | 2/2008 | Ben-Yehuda et al. | |
| 2009/0144330 A1* | 6/2009 | Draper | G06Q 30/02 |
| 2009/0163177 A1* | 6/2009 | Bearden | H04L 12/5835 455/412.1 |
| 2009/0164581 A1* | 6/2009 | Bove et al. | 709/205 |
| 2009/0222878 A1* | 9/2009 | Walsh et al. | 726/1 |
| 2009/0244012 A1 | 10/2009 | Behar et al. | |
| 2009/0244832 A1 | 10/2009 | Behar et al. | |
| 2009/0300511 A1 | 12/2009 | Behar et al. | |
| 2009/0303676 A1 | 12/2009 | Behar et al. | |
| 2009/0322790 A1 | 12/2009 | Behar et al. | |
| 2010/0082374 A1 | 4/2010 | Charania et al. | |
| 2010/0161432 A1* | 6/2010 | Kumanov et al. | 705/15 |
| 2010/0174993 A1 | 7/2010 | Pennington et al. | |
| 2010/0175104 A1* | 7/2010 | Khalid | G06F 9/545 726/1 |
| 2010/0211489 A1* | 8/2010 | Zhang | G06Q 30/02 705/34 |
| 2010/0211548 A1* | 8/2010 | Ott et al. | 707/655 |
| 2010/0306034 A1* | 12/2010 | Stein et al. | 705/10 |
| 2011/0047478 A1* | 2/2011 | Ellsworth | 715/747 |
| 2011/0066943 A1* | 3/2011 | Brillon et al. | 715/716 |
| 2011/0103564 A1* | 5/2011 | Couse | H04M 1/2535 379/201.03 |
| 2011/0153781 A1* | 6/2011 | Srinivas et al. | 709/219 |
| 2011/0202269 A1* | 8/2011 | Reventlow | 701/201 |
| 2011/0314502 A1* | 12/2011 | Levy | H04N 7/106 725/46 |
| 2012/0041793 A1 | 2/2012 | Farina et al. | |
| 2012/0042006 A1 | 2/2012 | Kiley et al. | |
| 2012/0066679 A1* | 3/2012 | Pappas | G06F 9/45558 718/1 |
| 2012/0271666 A1 | 10/2012 | Pennington et al. | |
| 2013/0167045 A1* | 6/2013 | Xu et al. | 715/760 |

* cited by examiner

METHOD AND APPARATUS FOR PUBLIC COMPUTING

RELATED APPLICATIONS

This application claims priority under 35 U.S.C. 119(e) to U.S. Provisional Application Ser. No. 61/405,861, entitled "METHOD AND APPARATUS FOR PUBLIC COMPUTING," filed Oct. 22, 2010, which application is incorporated herein by reference in its entirety.

BACKGROUND

1. Field of Invention

The present invention relates to computers and, more particularly, to portable computers for use in a public environment.

2. Discussion of Related Art

Conventional computers include some type of storage, for example a "hard drive," for storing files and system configurations, including programs or applications, documents, and other data. Generally, at least some of the data stored on a computer belongs to and/or is personal to the computer's owner or primary user. As a result, conventional computers do not lend themselves well to public use, since users may have concerns regarding the privacy of their data. In addition, conventional computers offer little to no passive functionality, that is, when they are not being actively used by a user, and may therefore simply be a nuisance in a public space when not being used.

SUMMARY OF INVENTION

Aspects and embodiments are directed to methods and apparatus for providing public computing and multi-dimensional contextual advertizing and/or provision of services. In one embodiment, a portable computer configured for public computing environments has a unique form factor that is configurable between a laptop mode and an easel mode in which the computer has an inverted "V" appearance. The computer provides for both an active experience in which the user is actively using a computer, and a passive experience in which the computer displays content with little or no intervention by a user. As discussed in more detail below, in one embodiment, the portable computer is configured to be used transiently in sessions, the end of which the computer is reset to a default configuration and history of the session is erased, thereby preserving the privacy of the transient users. According to another aspect, based on its connectivity with the Internet, and information about the users derivable from the location of the portable computers and/or type of access granted during a user session, the portable computer can be configured to provide dynamically variable, targeted promotional content, as discussed in more detail below.

According to one aspect of the present invention, a method of configuring a portable computer for transient use by a plurality of guests at a selected location is provided. The method comprises displaying a first selection of content on a display screen of the portable computer, initiating a first session responsive to a first guest of the plurality of guests accessing the portable computer via a user interface of the portable computer, creating a first guest profile responsive to the first session being initiated, during the first session, displaying second selection of content on the display screen, the second selection of content comprising more available content than the first selection of content, terminating the first session responsive to one of a termination action taken by the first guest and expiration of a time-out period, and erasing history of the first session on the portable computer responsive to termination of the first session. According to one embodiment of the present invention, displaying the first selection of content includes displaying a plurality of photographs associated with the selected location. According to another embodiment of the invention, displaying the first selection of content includes displaying information associated with the selected location. According to another embodiment of the invention, displaying the information includes displaying at least one of services available at the selected location, weather information associated with the selected location, and current events associated with the selected location. According to another embodiment of the invention, initiating the first session includes displaying a welcome screen containing information about the user interface of the portable computer.

According to one embodiment of the present invention, creating the first guest profile includes accessing remote computer storage coupled to the portable computer via a network connection, and storing the guest profile on the remote computer storage. According to another embodiment of the invention, the method further comprises erasing the first guest profile responsive to termination of the first session. According to another embodiment of the invention, erasing history of the first session further includes clearing cookies and web history created during the first session restoring a default configuration of the user interface to display the first selection of content, and resetting device configurations of the portable computer, including at least one of volume and screen brightness, to default settings. According to another embodiment of the invention, displaying the second selection of content includes displaying a home view comprising a plurality of cards, each card configured to provide access to associated content.

According to one aspect of the present invention, a portable computer system configured for transient use by a plurality of guests is provided. The portable computer system comprises a portable computer having a display screen, a display manager, and user interface configured to accept inputs from the plurality of guests and to display content on the display screen, and remote computer storage coupled to the portable computer via a network connection, wherein the portable computer is configured to initiate a first session responsive to an input received from a first guest of the plurality of guests via the user interface and to store a first guest profile on the remote computer storage, and to terminate the first session responsive to one of a termination action taken by the first guest and expiration of a time-out period, wherein terminating the first session includes erasing history of the first session on the portable computer, and wherein the display manager is configured to manage a plurality of views of computer content in the user interface, and to control the user interface to display a first selection of content on the display screen prior to initiation of the first session and after termination of the first session, and to display a second selection of content on the display screen during the first session, the second selection of content comprising more available content than the first selection of content. According to one embodiment of the present invention, the second selection of content includes a home view comprising a plurality of cards, each card configured to provide access to associated content. According to another embodiment of the invention, the plurality of cards includes at least one web card that maps to a web page, and at least one channel card.

According to one embodiment of the present invention, the portable computer system further comprises a communication component configured to access a web-based content, and wherein the display manager is configured to display the web-based content on the display screen responsive to guest selection of the at least one web card. According to another embodiment of the invention, the portable computer system further comprises an execution component configured to execute a first transformation from an unfocused view of a first card of the plurality of cards into a focused view of the first card responsive to computer focus on the first card, and wherein the execution component is further configured to execute a second transformation from the focused view of the first card into the unfocused view of the first card upon loss of computer focus on the first card. According to another embodiment of the invention, the focused view of the first card includes a header display and a body display, wherein the header display comprises at least one control displayed in the header display, and wherein the control is configured to execute computer-based functionality in response to execution by the first guest.

According to one embodiment of the present invention, the portable computer is located in a first location at a partner facility and further comprises at least one additional portable computer located in a second location at the partner facility, and a partner profile stored on the remote computer storage, the partner profile specifying a first configuration of the portable computer and a second configuration of the at least one additional portable computer. According to one embodiment of the present invention, a first card of the plurality of cards is a branded card having a visual appearance corresponding to a brand of the partner facility. According to another embodiment of the invention, the branded card is configured such that it cannot be deleted by any guest of the plurality of guests. According to another embodiment of the invention, the visual appearance includes at least one of a color scheme and a logo.

According to one aspect a non-transitory computer-readable medium having computer-readable instruction stored thereon that, as a result of being executed by a computer, instruct the computer to perform a method for configuring a portable computer for transient use by a plurality of guests at a selected location is provided. The method comprises displaying a first selection of content on a display screen of the portable computer, initiating a first session responsive to a first guest of the plurality of guests accessing the portable computer via a user interface of the portable computer, creating a first guest profile responsive to the first session being initiated, during the first session, displaying second selection of content on the display screen, the second selection of content comprising more available content than the first selection of content, terminating the first session responsive to one of a termination action taken by the first guest and expiration of a time-out period, and erasing history of the first session on the portable computer responsive to termination of the first session.

According to one embodiment of the present invention, displaying the first selection of content includes displaying a plurality of photographs associated with the selected location. According to another embodiment of the invention, displaying the first selection of content includes displaying information associated with the selected location. According to another embodiment of the invention, displaying the information includes displaying at least one of services available at the selected location, weather information associated with the selected location, and current events associated with the selected location. According to another embodiment of the invention, initiating the first session includes displaying a welcome screen containing information about the user interface of the portable computer.

According to one embodiment of the present invention, creating the first guest profile includes accessing remote computer storage coupled to the portable computer via a network connection, and storing the guest profile on the remote computer storage. According to another embodiment of the invention, the method further comprises erasing the first guest profile responsive to termination of the first session. According to another embodiment of the invention, erasing history of the first session further includes clearing cookies and web history created during the first session restoring a default configuration of the user interface to display the first selection of content, and resetting device configurations of the portable computer, including at least one of volume and screen brightness, to default settings. According to another embodiment of the invention, displaying the second selection of content includes displaying a home view comprising a plurality of cards, each card configured to provide access to associated content.

According to one aspect of the present invention, a computer system configured for transient use by a plurality of guests at a selected facility is provided. The computer system comprises a plurality of portable computers including a first portable computer and a second portable computer, the first and second portable computers being located at different locations at the selected facility, and each portable computer including a network connection, a display screen, a display manager, and a user interface configured to receive inputs from the plurality of guests and to display digital content on the display screen, and computer storage separate from the plurality of portable computers and coupled to each of the plurality of portable computers via the respective network connection, the computer storage including a facility profile specifying a first content configuration for the first portable computer and a second content configuration for the second portable computer, the first and second content configurations being different, wherein each portable computer is configured to initiate a first session responsive to an input received from a first guest of the plurality of guests via the user interface, and to terminate the first session responsive to one of a termination action taken by the first guest and expiration of a time-out period, wherein the display manager is configured to manage a plurality of views of computer content in the user interface, and to control the user interface to display a first selection of content on the display screen prior to initiation of the first session and after termination of the first session, and to display a second selection of content on the display screen during the first session, the second selection of content comprising more available content than the first selection of content, and wherein the plurality of views of computer content for the first and second portable computers are determined based on a first and second content configurations, respectively.

According to one aspect of the present invention, a method of contextually providing services via a portable computer at a selected location is provided. The method comprises determining location-specific information about the selected location, determining status information about a user of the portable computer interface, and displaying an available service to the user on a display screen of the portable computer, the available service being selected based on the location-specific information and the status information. According to one embodiment of the present invention, the method further comprises determining time-based information, and wherein the available service is selected based on the location-specific information, the status information and the time-based information. According to another embodiment of the invention, the selected location is a hotel; and wherein the status information includes the user's status a guest at the hotel. According to another embodiment of the invention, the location-specific information includes services offered at the hotel. According to another embodiment of the invention, the location-specific information includes at least one of weather information, news, and an event at the selected location.

According to one embodiment, the method further comprises accepting an input from the user via the portable computer interface to allow the user to purchase the available service, and updating a user profile to indicate purchase of the available service. According to another embodiment of the invention, the method further comprises linking a plurality of portable computers located at the selected location to form a group of portable computers including a first portable computer and a second portable computer. According to another embodiment of the invention, the method further comprises updating the available service displayed on the display screen of the second portable computer responsive to user activity on the first portable computer. According to another embodiment of the invention, the user activity on the first portable computer includes purchase of the available service by the user. According to another embodiment of the invention, displaying the available service includes displaying the same available service on the display screen of each portable computer in the group of portable computers, the available service being selected based on the location-specific information and the status information of the user of the first portable computer.

According to one aspect a non-transitory computer-readable medium having computer-readable instruction stored thereon that, as a result of being executed by a computer, instruct the computer to perform a method for contextually providing services via a portable computer at a selected location is provided. The method comprises determining location-specific information about the selected location, determining status information about a user of the portable computer interface, and displaying an available service to the user on a display screen of the portable computer, the available service being selected based on the location-specific information and the status information. According to one embodiment of the present invention, the method further comprises determining time-based information, and wherein the available service is selected based on the location-specific information, the status information and the time-based information. According to another embodiment of the invention, the selected location is a hotel; and wherein the status information includes the user's status a guest at the hotel. According to another embodiment of the invention, the location-specific information includes services offered at the hotel. According to another embodiment of the invention, the location-specific information includes at least one of weather information, news, and an event at the selected location.

According to one embodiment, the method further comprises accepting an input from the user via the portable computer interface to allow the user to purchase the available service, and updating a user profile to indicate purchase of the available service. According to another embodiment of the invention, the method further comprises linking a plurality of portable computers located at the selected location to form a group of portable computers including a first portable computer and a second portable computer. According to another embodiment of the invention, the method further comprises updating the available service displayed on the display screen of the second portable computer responsive to user activity on the first portable computer. According to another embodiment of the invention, the user activity on the first portable computer includes purchase of the available service by the user. According to another embodiment of the invention, displaying the available service includes displaying the same available service on the display screen of each portable computer in the group of portable computers, the available service being selected based on the location-specific information and the status information of the user of the first portable computer.

According to one aspect of the present invention, a computer system configured to contextually provide services to a plurality of transient users at a facility located at a specified location is provided. The computer system comprises a plurality of portable computers located at the facility, each portable computer including a network connection, a display screen and a user interface configured to receive inputs from the plurality of transient users and to display digital content on the display screen, computer storage separate from the plurality of portable computers and coupled to each of the plurality of portable computers via the respective network connection, and a facility computer system coupled to the computer storage and to the plurality of portable computers, the facility computer system configured to provide facility-specific information to the plurality of portable computers, wherein the digital content displayed on the display screen of a first portable computer of the plurality of portable computers includes an available service selected based on status information of at least one of the plurality of transient users and at least one of the facility-specific information and location-specific information about the specified location.

According to one embodiment of the present invention, the first portable computer is configured to receive the location-specific information from the Internet via the network connection. According to another embodiment of the invention, the location-specific information includes at least one of weather information, news, and events within a predetermined distance from the specified location. According to another embodiment of the invention, available service is further selected based on at least one of a time and a date of access of the first portable computer by the at least one transient user. According to another embodiment of the invention, the facility-specific information includes an event at the facility. According to another embodiment of the invention, the facility is a hotel and wherein the status information includes the at least one transient user's status as a guest at the hotel. According to another embodiment of the invention, the plurality of portable computers further includes a second portable computer; and wherein the first and second portable computers are linked to form a group. According to another embodiment of the invention, the digital content displayed on the display screen of the second portable computer includes the same available service displayed on the display screen of the first portable computer. According to another embodiment of the invention, the digital content displayed on the display screen of the second portable computer includes content selected based on interaction of a first transient user with the first portable computer.

Other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
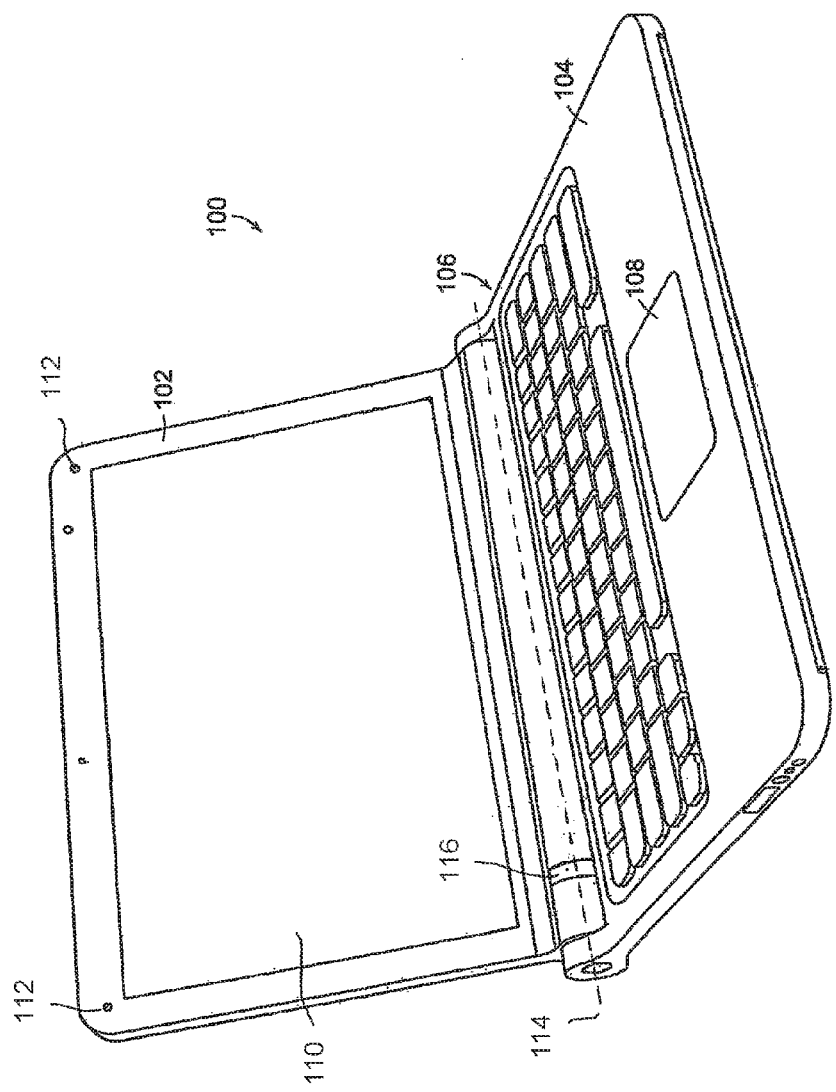
FIG. 1 is an illustration of one example of a portable computer configured in a laptop mode, according to aspects of the invention.

Aspects and embodiments are directed to a portable computer configured for public computing environments that is configured for simplicity and ease of use with a focus on the Internet. In one embodiment, the portable computer has a unique form factor that is configurable between a "laptop" mode in which the computer has a "clam-shell" appearance, and an easel mode in which the computer has an inverted "V" appearance. The computer is also configurable between an active mode in which interaction with a user is a primary aspect of the user interface, and a passive mode in which interaction with a user is absent or minimal. The unique form factor, user interface and dual active and passive modes of embodiments of the portable computer offer many benefits in public spaces, including significant passive functionality as well as secure, easy-to-use Internet access and web-focused operations for transient users.

According to one embodiment, the portable computer 100 is provided in a public space by a "partner," generally the owner or manager of the public space or a portion thereof. The partner acts as an administrator of the portable computer and defines certain aspects of the user interface for the portable computer and the computer's functionality, as discussed further below. Within the public space, the portable computer is used intermittently by multiple transient users, also referred to as guests. Guests may have some ability to configure the portable computer to tailor their own computing experience, but these configurations are also transient, as opposed to the more persistent configurations defined by the partner, and end with the end of the user's interaction with the computer, as discussed below.

In one embodiment, the portable computer is integrated with a computing cloud, such that only minimal data is stored locally on the device itself, as also discussed below. This configuration is particularly well suited to use in public environments by multiple transient users because any personal user data is not stored on the device itself (which could lead to privacy concerns), but instead is stored and/or accessed via the cloud, as discussed further below. Based on its connectivity with the Internet, as well as information such as its location and type of guests provided with access, the portable computer can be configured to provide multi-dimensional contextual advertisements and services that are not available through conventional advertizing mechanisms. For example, a billboard may provide passive, location-based advertizing, but is not dynamically configurable or responsive to any particular viewer. By contrast, embodiments of the portable computer may have access to location, environmental (e.g., weather, local events, etc.), and/or guest status (e.g., the guest is a hotel guest, a library member, etc.) information and therefore may be configured to provide dynamically variable contextual advertizing and/or services that are not only location-based, but also environment-based and/or status-based, as discussed in more detail below. Thus, the portable computer may offer benefits to both the partner and the guests that are not available through conventional computing devices.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1 there is illustrated one example of a portable computer 100 that is configurable between a "laptop" mode (in which the portable computer has a conventional laptop appearance, as illustrated in FIG. 1) and an "easel" mode in which the base 104 of the computer and its display component 102 stand upright forming an inverted "V," as discussed further below and illustrated in FIG. 2. The base 104 includes a keyboard 106 and internal electronic components (not shown), such as a central processing unit, memory, and other components necessary to operate the portable computer, as known to those skilled in the art. In some embodiments, the base 104 may also include input devices in addition to the keyboard 106, such as, for example a touch pad 108 or trackball (not shown), for receiving user commands, as known to those skilled in the art. In one embodiment, the display component 102 includes a display screen 110 that displays digital content, as discussed further below. The display component 102 may also include cushions 112 that provide soft contact points between the base 104 and the display component 102 when the portable computer is closed. In one example, the cushions 112 are made of rubber. However, it is to be appreciated that the invention is not so limited, and the cushions 112 may comprise materials other than rubber, including, for example, a polymer, felt, or other suitable materials as would be recognized by those skilled in the art given the benefit of this disclosure.

In the laptop mode, the display component 102 is inclined at a viewing angle from the base 104, as illustrated in FIG. 1 The display component 102 and base 104 are pivotably coupled together by a hinge assembly (not shown) that allows the display component and base to be rotated with respect to one another. The hinge assembly may include a single or multiple hinges, which may be any of a variety of hinge types, including, but not limited, to single-axis hinges, multiple-axis hinges, geared hinges, etc. In one example, the hinge assembly allows the display component 102 and the base 104 to be rotated (or tilted) about a longitudinal axis 114 running along an interface between the display component and the base 104. Rotating the display component 102 and/or the base 104 about the longitudinal axis 114 configures the portable computer 100 from the laptop mode into the easel mode, illustrated in FIG. 2, or vice versa.

Figure 2:
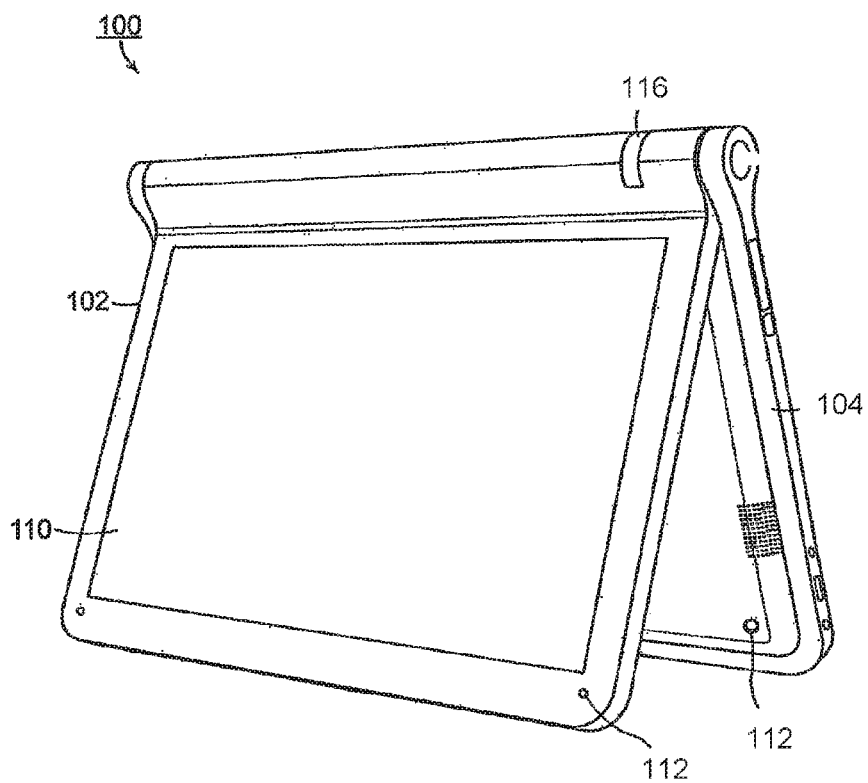
FIG. 2 is an illustration of an example of a portable computer configured in an easel mode, according to aspects of the invention.

Referring to FIG. 2, in the easel mode, base 104 and the display component 102 form an inverted "V" shape with the bottom of the base and the back of the display component face another. In the easel mode, the display screen 110 is visible and accessible on one side of the portable computer 100 and the keyboard 106 (not shown in FIG. 2) is visible and accessible on the other side. When the portable computer 100 is in the easel mode, the base 104 is disposed at an angle relative to the display component 102. This angle is adjustable, for example, to allow a comfortable viewing angle to the display screen 110 to be maintained for different positions of a user and of the portable computer 100. According to one embodiment, when the portable computer 100 is configured into the easel mode, the visual display on the display screen 110 is automatically rotated 180 degrees such that the information appears "right-way-up," even through the display screen is upside-down compared to when the portable computer is in the laptop mode. Thus, a user may simply "flip" the portable computer 100 into the easel mode and immediately be able to comfortably view information on the display screen 110, without having to access display screen controls to adjust the orientation of the visual display.

In one embodiment, the portable computer 100 includes an orientation (or mode) sensor that is configured to detect whether the portable computer is in the laptop mode or the easel mode, and to adjust the display accordingly. The orientation sensor may be incorporated into the base component 104, for example, underneath the keyboard 106, or into the display component. In one example, locating the orientation sensor in the display component 102, rather than the base 104, may provide more robust detection and therefore, may be presently preferred in some embodiments. The orientation sensor may be used to determine a precise relative orientation of the base component 104 with respect to the display component 102, or vice versa, for example, to determine whether the device is in the laptop mode, easel mode, or some point in between the two modes. In one example, the orientation sensor includes an accelerometer whose output is fed to the computer operating system (or to dedicated logic circuitry) which then triggers a display inversion as appropriate.

According to one embodiment, the portable computer 100 includes one or more additional navigation devices, such as a scroll wheel 116. In one example, the scroll wheel 116 is positioned, as shown in FIGS. 1 and 2, such that it is rotatable about the longitudinal axis 114 running along the interface between the display component 102 and the base 104. Accordingly, positioning the scroll wheel 116 on the longitudinal axis 114 may have certain advantages, including providing accessibility to the scroll wheel in the different configuration modes of the portable computer; however, it is to be appreciated that the scroll wheel may be placed in any convenient or suitable location on the portable computer, not limited to the position shown in FIGS. 1 and 2. The scroll wheel 116 may be used alone or in conjunction with one or more keys (for example, dedicated navigation keys) on the keyboard 106.

Figure 3:
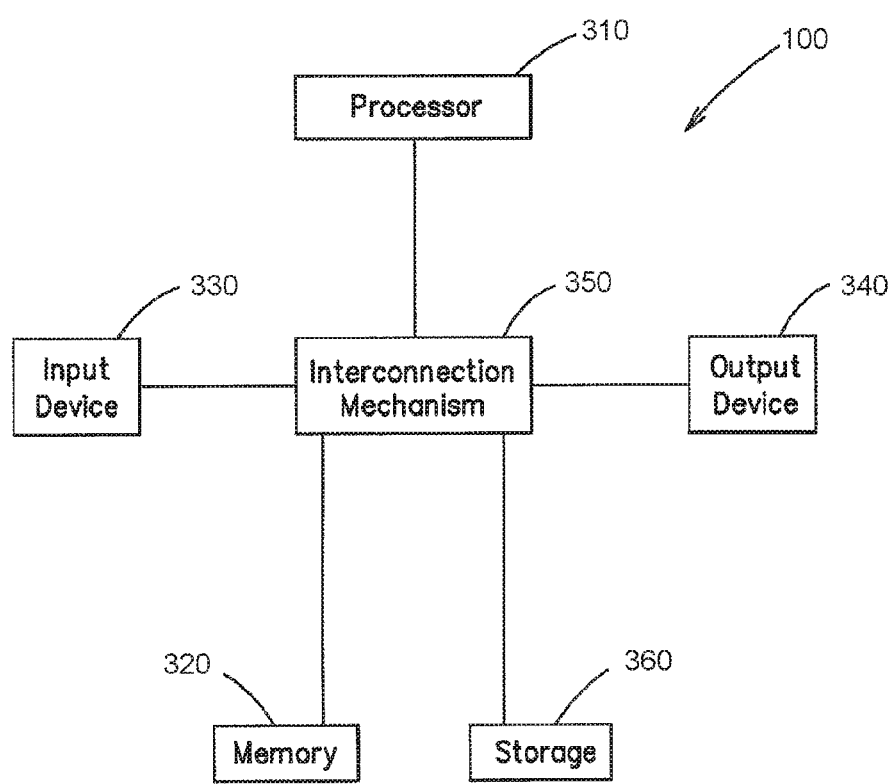
FIG. 3 is a functional block diagram of one example of a computer system.

FIG. 3 is a functional block diagram of some components of an example of the portable computer 100, in which various aspects of the present invention may be practiced. For example, various aspects of the invention may be implemented as specialized software executing in one or more computer systems including multiple computer systems communicating over network. As illustrated in FIG. 3, the computer 100 includes a processor 310, a memory 320, one or more input devices 330 (such as the keyboard 106 and scroll wheel 116) and one or more output devices 340 (such as the display screen 110) interconnected by an interconnection mechanism 350. The interconnection mechanism 230 enables communications (e.g., data, instructions) to be exchanged between system components of the computer system 100. The interconnection mechanism 230 may include one or more physical busses (for example, busses between components that are integrated within a same machine), or may include any communication coupling between system elements including specialized or standard computing bus technologies such as IDE, SCSI, PCI and InfiniBand. The portable computer 100 may further include a storage device 360, as discussed further below. The portable computer 100 may programmable using a high-level computer programming language.

In one example, the processor 310, which may include one or more microprocessors or other types of controllers, can perform a series of instructions that result in manipulated data. The processor 310 may be a commercially available processor such as an Intel PENTIUM, Motorola PowerPC, SGI MIPS, Sun UltraSPARC, or Hewlett-Packard PA-RISC processor, but may be any type of processor or controller as many other processors and controllers are available. The processor may also execute a shell process that manages at least a portion of the hardware elements included in computer 100. The shell may be provided in addition to or integrated with a conventional operating system which can include, among others, a Windows-based operating system (for example, Windows NT, Windows 2000 (Windows ME), Windows XP, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems and/or shell processes can be used, and embodiments are not limited to any particular operating system or shell process. The processor and operating system together define a computer platform for which application programs in high-level programming languages are written. It is to be understood that the invention is not limited to a particular computer system platform, processor, operating system, or network. Also, it should be apparent to those skilled in the art, given the benefit of this disclosure, that the present invention is not limited to a specific programming language or computer system.

The memory 320 may be used for storing programs and data during operation of the portable computer 100. Thus, the memory 320 may be a relatively high performance, volatile, random access memory such as a dynamic random access memory (DRAM) static memory (SRAM), or Flash memory; however, the memory 320 may include any device for storing data, including a non-volatile storage device. In various embodiments, the memory 320 can be organized into particularized structures to perform the aspects and functions disclosed herein. The storage 360 may include a computer readable and writeable nonvolatile storage medium in which instructions are stored that define a program to be executed by the processor 310. The storage system 360 also may include information that is recorded, on or in, the medium, and this information may be processed by the program. The instructions may be persistently stored as encoded signals, and the instructions may cause a processor to perform any of the functions described herein. The medium may, for example, be a flash memory. The processor 310 generally manipulates the data within the memory 320, and then copies the data to the storage 360 after processing is completed. A variety of mechanisms are known for managing data movement between the storage 360 and memory 320.

In one embodiment, the portable computer 100 does not incorporate mass storage (i.e. a hard drives), instead the system is configured to employ RAM and Flash memory storage (memory 320 and storage 360 discussed above) to accommodate basic operation and local functions, with mass storage capability being provided remotely via the Internet, as discussed further below. Thus in some embodiments, traditional features such a download, have been configured to operate differently for the computer 100. In one example, operations that require large amounts of computer storage are transformed into remote storage requests. In one embodiment, the portable computer 100 is configured to identify local storage requests and transform them into a storage request to an on-line service provider identified in a user and/or device profile. In another embodiment, the system prompts a user to identify a service provider in response to a local request. Various operations may be transformed, including download and print operations, among others.

Still referring to FIG. 3, the input device(s) 330 and output device(s) 340 allow the computer 100 to exchange information and communicate with external entities, such as users and other systems. Input devices 330 may accept information from external sources. Examples of input devices 330 include, among others, the keyboard 106, scroll wheel 116, mouse devices, trackballs, microphones, touch screens, and network interface cards. Output devices 340 may render information for external presentation and transfer information to external entities. Output devices 340 may include, for example, the display screen 110, printing devices, speakers, video cards and separate video memory for improved processing performance, and network interface cards.

The portable computer 100 may include specially-programmed, special-purpose hardware, and various aspects discussed herein may be implemented in software executing on hardware, hardware or firmware, or any combination thereof. Although the portable computer 100 and the functional block diagram of FIG. 3 are shown by way of example as one type of computer system upon which various embodiments may be practiced, aspects of the invention are not limited to being implemented on the computer system as shown in FIGS. 1-3. Various aspects and functions in accord with the present invention may be practiced on one or more computers having a different architectures or components than those shown in FIG. 3. Examples of a special-purpose portable computer on which various aspects and embodiments in accord with the present invention may be practiced are discussed in more detail in U.S. patent application Ser. No. 12/170,939 filed on Jul. 10, 2008 and U.S. patent application Ser. No. 12/170,951 filed on Jul. 10, 2008, both of which are herein incorporated by reference in their entireties.

According to one embodiment, one or more portions of the computer system may be distributed across one or more computer systems coupled to a communications network. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. In one embodiment, an Internet cloud is maintained on server systems accessible from a plurality of devices. These components may be executable, intermediate (e.g., IL) or interpreted (e.g., Java) code which communicate over a communication network (e.g., the Internet) using a communication protocol (e.g., TCP/IP). It should be appreciated that the invention is not limited to executing on any particular system or group of systems. Also, it should be appreciated that the invention is not limited to any particular distributed architecture, network, or communication protocol.

According to one embodiment, the portable computer 100 is configured with a primary focus on the Internet or "web." As such, the portable computer 100 is integrated with remote content storage and access to provide seamless access to content stored remotely via the Internet. The integration with remote storage services, which may be provided by a third party and/or may be specific to the portable computer, permits reduced storage capacity on the portable computer 100 itself. For example, as discussed above, in one embodiment the portable computer 100 does not include a hard drive or other local mass storage device. Rather, data, such as programs, files, digital content (e.g., photos, videos, audio files, etc.), documents, etc., are stored remotely in the "cloud," accessed via the Internet. Certain core or basic data and/or programs may be stored locally on the portable computer 100 using the memory 320 and/or storage 360; but the bulk of "user data" and digital content is stored remotely in the cloud. As used herein the term "cloud" is intended to refer to computer readable/writable storage devices that are remote from the portable computer 100 (i.e., not part of the same physical device) and accessible from multiple locations and/or devices (e.g., multiple different portable computers 100) via the Internet. Reducing and/or eliminating the need for non-volatile storage in the computer system is advantageous in that the portable computer 100 may be reduced in complexity and/or cost. In addition, this configuration makes the portable computer 100 particularly well suited to use in public environments by multiple transient users because any personal user data is not stored on the device itself (which could lead to privacy concerns), but instead is stored and/or accessed via the cloud using secure user identification techniques, as discussed further below.

Figure 4:
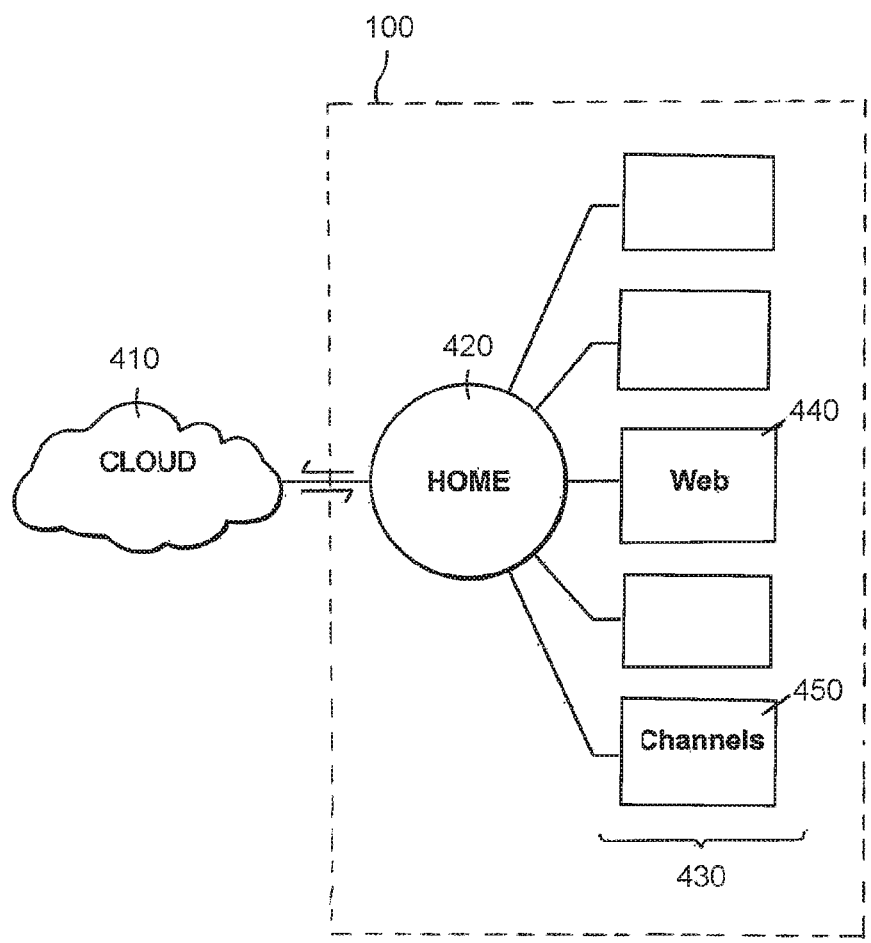
FIG. 4 is a functional block diagram of one example of a portable computer user interface architecture according to aspects of the invention.

Referring to FIG. 4 there is illustrated a functional block diagram of one example of a portable computer user interface architecture according to one embodiment. As discussed above, the portable computer 100 interfaces with the cloud 410 where the bulk of the data and/or digital content used/accessed by the portable computer is stored on digital storage media controlled by the portable computer service provider. In one example, a shell process and/or the processes it instantiates manages communication between the portable computer 100 and the cloud 410 (e.g., the Internet) to permit access to cloud based services and cloud based content to a user of the portable computer 100. Cloud-based services and the cloud-based content accessed can be of any type, including any web-based content. Typically, the cloud based content and cloud based services includes services made available by third party providers, either for free or requiring payments.

The user interface includes a "home" view 420 that provides access to a plurality of modes of content 430, as discussed further below. Various programs, features, applications and information may be organized into the different modes of content such that by selecting a particular mode, a user may access the content organized within that mode. In the illustrated example, the home view 420 contains five modes of content 430; however, it is to be appreciated that the home view may include more or fewer than five modes of content and that the modes of content may differ from the examples discussed below. For example, a "web" mode 440 may provide access to Internet browsing and searching; and a "channel" mode 450 may provide access to different functionality of the portable computer 100, with various features and functions defined as different channels, as discussed further below. For example, the channel mode of content 450 may include an alarm clock channel in which the portable computer 100 is configured to display a clock and can be programmed to activate an alarm at a predetermined time. Another example of a channel is a "photo frame" channel in which the portable computer is configured to display a preselected image or set of images, etc. Another example of a channel is a "television" channel, in which the portable computer is configured to stream Internet television. These and other examples of channels are discussed in more detail below. Some or all of the modes of content 430 may access, retrieve and/or store information on the cloud 410. In one embodiment, the home view 420 is the default view when the portable computer enters the active mode, as discussed further below.

According to one embodiment, visual representations of different modes of content 430 are rendered as cards. According to one aspect, cards can be viewed as the building blocks of the user interface, providing access to a plurality of views and/or content. Cards render computer content (e.g., web-based, application specific, etc.) depending on a particular view that is currently active on the portable computer. Cards present a consistent and intuitive interface between a user and the computer content associated with a particular card. Each card displays summary information of available content accessible through that card and/or presents a visual indication of available functions accessible through that card. Different types of cards may be employed to render different types of available content, features and functionality. For example, web-based content may be rendered as a web card that is associated with a mapping to web content. Some web cards map directly to web pages and in response to selection of the web card the portable computer executes the mapping and displays a web view of the content. A shell process may be provided that can control the instantiation and display of the cards shown in a user interface. The shell can be configured to provide different views of a card based on a mode of operation and/or a selected view. Other cards may be used to provide interactive displays selectable by a user. For example, channel cards correspond to the channels set up on the portable computer. For example, for an Internet TV channel, a corresponding channel card may be configured to stream web-based content using an RSS feed. Web cards and channel cards are building blocks of the user interface managed by the shell to be displayed to an end user on a web optimized device. The views of the cards managed by the shell are configured to permit easy selection of the web-based content associated with the card.

The displayed cards and the views of the cards provided can be configured to be responsive to a mode of operation for the device, under the control of a shell process that among other functions manages the display of cards in the user interface. The particular visualization of the card and/or the view of multiple cards can be transitioned to another view based on changes of the mode of operation. Reference to modes of the computer and modes of the device can include aspects of the physical configuration of the portable computer/device, as illustrated. The portable computer is capable of different display formats and functionality in the different modes, and includes a graphical user interface that can work seamlessly with the computer hardware to provide a unified, comfortable, holistic user experience. A more detailed discussion of embodiments and examples of a card-based system for rendering computer based content in visual representations is discussed in U.S. patent application Ser. No. 12/416,479, filed on Apr. 1, 2009 and entitled "SYSTEM AND METHOD FOR STREAMLINING USER INTERACTION WITH ELECTRONIC CONTENT," which is incorporated herein by reference in its entirety.

Figure 5:
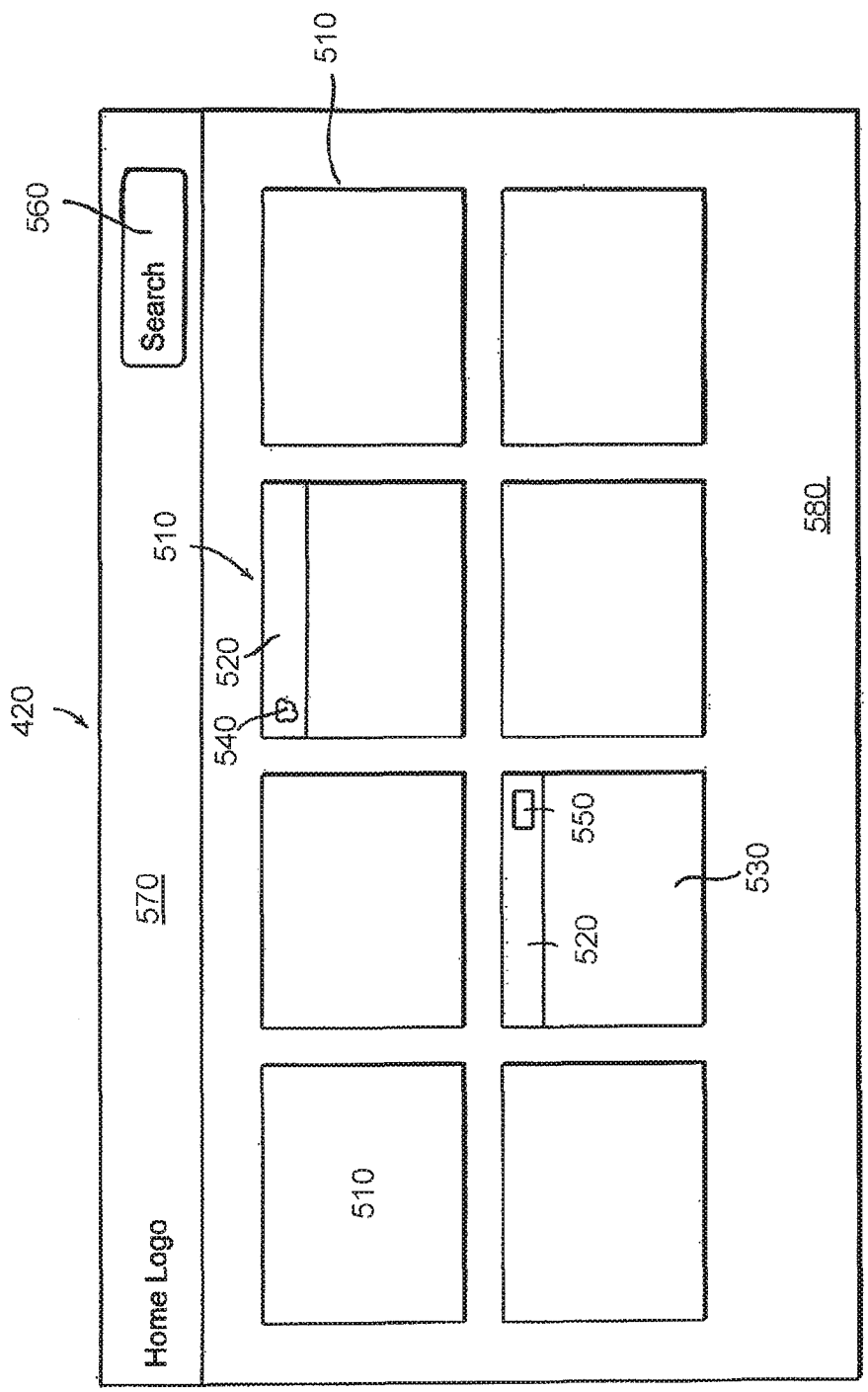
FIG. 5 is a block diagram of one example of a home view of a user interface for a portable computer according to aspects of the invention.

Accordingly, referring to FIG. 5, the home view 420 may include a display of one or more cards 510, each card providing access to computer based content. As illustrated in FIG. 5, in one example, the home view 420 includes a header region 570 and a body region 580 in which the plurality of cards 510 are arranged and displayed. Since web-based activity is a focus for at least some embodiments of the portable computer 100, the home view header 570 may include a search bar 560 to allow users easy access to web browsing directly from the home view 420. The header region 570 may include aspects selected by the partner, for example, a logo, image or tag-line associated with the partner's brand. These "brand" aspects may be provided alone or in conjunction with another image or logo associated with the portable computer service provider's brand; however, as referred to herein "brand" aspects or elements are intended to refer to aspects associated with the partner's brand, unless otherwise stated. According to some embodiments, the home view 420 is the primary mechanism for permitting users to access cards 510 and navigation through content viewed on the portable computer 100, and therefore may be the default view when the portable computer 100 enters the active mode. In the home view 420, a user can access open web sessions, view and manage channels, initiate new web sessions, and launch other activities. According to one embodiment, the home view 420 is configured to manage and organize the cards 510. The home view 420 provides a simple and convenient interface for navigating through the features and content accessible through the portable computer 100 by organizing and managing cards 510.

Still referring to FIG. 5, each card 510 in the home view 420 may include a header 520 which runs along the top of the card and displays a title of the card, and a body 530 that displays a summary of the content available through that card. For example, the body 530 of a channel card may comprise a visualization of an RSS feed from the web site source. For non-RSS-based channels, the body 530 of the channel card may display an image associated with the channel content, for example, a small clock for an alarm clock channel or a relevant picture for a photo-album channel. In one example, a web card presents a thumbnail view of the current state of the associated web page. Each card may also incorporate aspects of the partner's brand, such as, for example, using a color scheme associated with the partner's brand, and/or brand logos or images. Different types of cards (e.g., channel cards and web cards) may use different variations of an overall color scheme so as to provide an immediate visual distinction between the different types of cards. The header 520 may also optionally include a "favicon" 540 which may be retrieved from the website being viewed in the case of web and channel cards, for example, or may be a custom image that suggests the channel content to the user. The header 520 may also include an "options" menu 550 which reveals the card options, and may in some embodiments invoke an animation of the card flipping over to reveal selectable options on the "back" side of the card, as discussed in more detail below. Rendering different features and functions of the portable computer consistently as cards, each having a similar appearance, provides an easy-to-use interface for a user to access a variety of different aspects without having to "decode" a complex or unfamiliar computer architecture. This card-based user interface is thus particularly well-suited to transient use for short periods of time by users potentially unfamiliar with the portable computer, as occurs in public environments.

Figure 6:
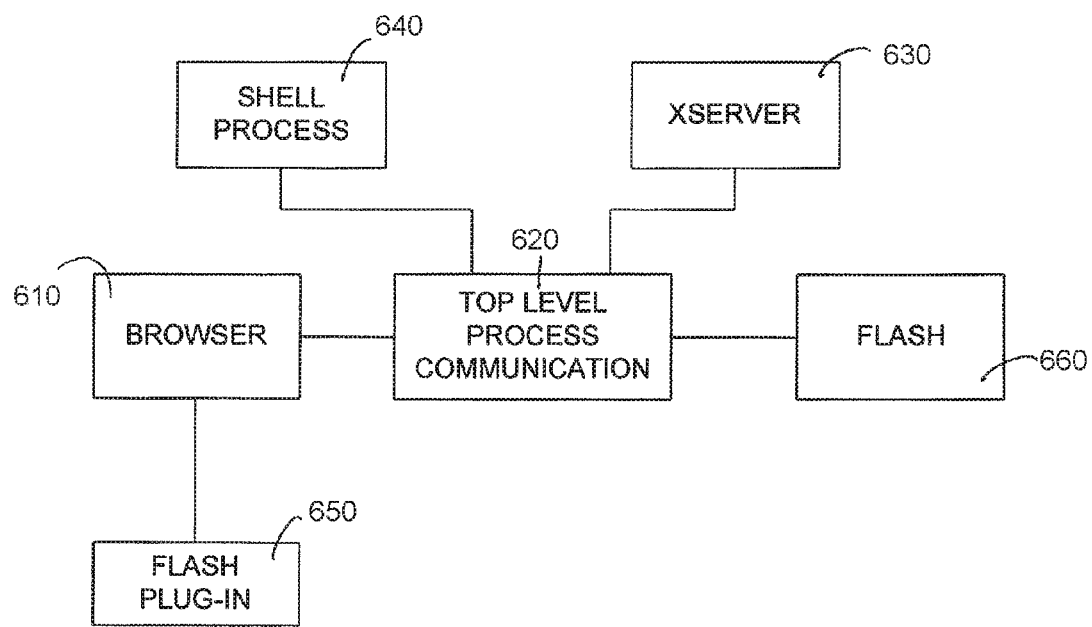
FIG. 6 is a functional block diagram of one example of components that operate in conjunction to retrieve web content and render a display of that content on a computer system, according to aspects of the invention.

Each card can be configured to render web-based content via operation of a browser process and any additional plug-in required to display its respective content. In particular, FIG. 6 illustrates an example block diagram of components that operate in conjunction to retrieve web content and render a display of that content in the form of a card. In the illustrated example, a card is presented by operation of a browser engine 610 communicating over a top level communication channel 620 to an xserver process 630 and a shell process 640 which manages the display of the card in a user interface. The shell 640 can be configured to manage the compositing of the content to be rendered by xserver process 630. In some embodiments, shell 640 provides commands to the xserver process 630 to render display controls within the displayed content. In other embodiments, the shell 640 can be configured to composite the browser content with display controls and pass the result to the xserver 630 for rendering. The browser engine 610 can also be configured to execute a flash plug-in 650 to render flash based content, and the browser engine can communicate the combined and/or flash content to be rendered, via the communication channel 620 to the shell 640 and/or the xserver 630.

Alternatively, a flash engine 660 can be executed on its own to present content for compositing by the shell 640 and/or rendering by the xserver 630. In one embodiment, each of the component processes can be executed as its own java script engine, with the top level communication channel 620 configured to permit communication between the components. In another embodiment, each java script engine can be configured with bindings to native code bases to execute the desired functionality. In one example, native C libraries can be exposed to the engines as JScript objects to be executed by the java script engines. According to some embodiments, cards that employ flash plug-ins or utilize a separate flash engine are limited to one invocation of a flash process. In other embodiments, each card can be configured to execute its own flash instance. In some examples, each of the flash instances can be constrained by a memory bound. The memory bound can be configured for each card individually. In other embodiments, the memory bound can be configured by the type of card.

In addition, according to some embodiments, the shell can be configured to receive content directly from a web-based source and pass the content to rendering engine (e.g. xserver 630). Thus, according to some implementations, the content for a card can be entirely controlled within the shell 640. In some examples, functions associated with a browser engine 610 can be embedded within the shell 640 to permit the shell to directly control the content associated with a particular card.

Embodiments of the portable computer 100 may be configured for transient use in a wide variety of public environments, such as, for example, hotels, libraries, schools, service offices (e.g., doctors' offices, dentists' offices, etc.) airports, and/or coffee shops. Transient usage brings with it a host of requirements that do not apply in private/home user, notably including protection of the transient users' personal information, and providing useful "passive" operation. In public spaces, goals of the portable computer 100 include both providing the transient users with useful content and a seamless web computing experience that is easy to use, and providing benefits to the partner by, for example, offering increased revenue opportunities through multi-dimensional contextual service-providing, as discussed further below.

According to one embodiment, the portable computer 100 is configured to operate in sessions. During a session, a transient user (also referred to as a guest) may interact with the portable computer, create cards, make changes, and generally use the computer as one would in a private setting. Once a session ends, all history of that session is permanently cleared to make way for the next guest. In this manner, guest privacy is preserved because no personal information, data, or even settings is retained once a session ends. In one embodiment, sessions use a pseudo-login and pseudo-logout to provide guests with a familiar interface by which to initiate and end a session, as discussed further below. The portable computer 100 may also be configured to operate, and optionally provide some limited interaction with guests outside of a session. In particular, the portable computer may operate in the passive mode outside of a session.

As discussed above, embodiments of the portable computer 100 are configured for both an active mode and a passive mode. In one embodiment, while the active mode may resemble a more traditional computer experience, providing interaction with the keyboard and other input devices (e.g., a mouse), the passive mode offers limited interaction and emphasizes a TV-like experience of content. In one embodiment, the passive mode is a content viewing mode that is triggered when no user interaction with the device occurs for some predefined period of time. The passive mode may be thought of a screen saver mode; however, the passive mode maybe specially configured to permit the portable computer to act as a passive information and/or entertainment device, such as a photo frame or clock, and the display can be configured to provide useful function even when the device is not being actively used. The portable computer may do so, for example, in the in the easel mode without taking up much surface area on a desktop. The passive mode is particularly well suited for portable computers in public spaces where direct interaction with guests occurs only intermittently, and the computers may sit idle for significant amounts of time. In the passive mode, the portable computer 100 may display information selected by the partner, for example, photo slideshows, local news, and/or information such as weather, nearby events, available services at the location, etc. Accordingly, the portable computer may be configured to operate in the passive mode "outside" of a session, and therefore all passive functionality, and channels associated therewith, remains active outside of a session, as discussed further below. In one embodiment, the portable computer may also have limited active mode functionality outside of a session; however, the dominant mode of operation outside of a session may be the passive mode.

In the passive mode, the portable computer generally displays a channel view, which is a full-screen view of a selected channel. The channel displayed in the passive mode may be user-selected within a session, as discussed further below, or partner-defined outside of a session. The default configurations of the portable computer, in particular of the home view 420, are set by the partner in conjunction with the portable computer service provider. The partner may configure the default appearance of the portable computer user interface both within sessions and outside of a session. Session configurations provide a system that enables partners to curate the guest experience. Outside of a session, configuration settings may allow the partner to define the look of, functionality of, and information provided by, the portable computer, including the channel(s) to be displayed in the passive mode. The system is flexible, allowing partners to define unique configurations for groups of portable computers according to their location and needs. In one embodiment, the configuration process includes choosing default cards for the home view, configuring the network, localizing the interface, and defining the default settings for each portable computer.

According to one embodiment, default configurations for the portable computer, or group(s) of portable computers, owned by the partner are stored in the cloud under a partner profile. The partner profile, in some examples, is retained in remote storage in the cloud 410, and accessed upon start up of any portable computer associated with the partner. The partner profile permits guest experiences to be consistent even across multiple portable computers. In the partner profile, the partner may define the guest experience on the partner's portable computers by defining one or more configurations. Configurations define which cards appear in the home view 420 as well as the default settings for the portable computer (s). Partners may create, edit and delete configurations by logging into to their guest profile in the cloud 410. Because configurations and customizations are retained in remote storage in the cloud; changes on one portable computer may be written to the remote storage, propagating changes across multiple portable computers that access the remote storage. Thus a common experience is also provided across multiple portable computers.

In one embodiment, the portable computer service provider defines a basic default configuration, referred to as the "portable computer" configuration, that provides a starting point from which the partner may customize one or more configurations. The portable computer configuration may include one or more default cards visible in the first page of the home view 420. For example, the portable computer configuration may include a weather channel card, an alarm clock channel card, a home-page web card, and a new web card. As discussed above, a web card is associated with a URL linking to a web page. In one example, the home-page web card corresponds to the portable computer service provider's home page. In another example, the home-page web card corresponds to the partner's home-page, or the partner's proxy sign-in page that allows guests to access the Internet using the partner's network service. The partner may configure the home-page web card in a partner configuration. The home-page web card may have any corresponding URL selected by the partner. Partners who just want to provide the simplest web browsing experience may opt to use a popular search engine, for example; coffee shops or airports with paid wireless services may choose to show a welcome screen detailing the program and providing a log in screen; restaurants may offer a menu; hotels may provide a website promoting services and nearby attractions at their specific location. The new web card is a blank web card that allows guests, within sessions, to define their own custom web cards linked to web pages of their choice, as discussed further below. In one example, whatever the partner's choice for the home-page web card URL, every new web card created shows the partner-specified home-page by default, until reconfigured by a guest during a session. The home-page web card itself will always be locked to the partner-selected URL and cannot be changed by a guest.

Within a partner configuration, the partner may add additional "branded" cards to the cards provided in the portable computer configuration. A collection of branded cards may be defined by the partner as cards which provide core functionality. Branded cards may include channel cards, web cards and/or system cards. System cards may map to specific functionality or content defined by the partner, such as, for example, restaurant or room-service menus for hotel partners, local area maps, etc. As discussed above, a partner's branded cards may incorporate elements of the partner's brand, such as a particular color scheme, logo items, etc. In one example, only the partner's branded cards may display the brand elements. In other examples, all cards may incorporate the partner's brand elements, optionally with variations in the color scheme or other visual aspects of the cards differentiating between portable computer default cards, partner-defined cards, and user-defined cards added by guests during their sessions. In one embodiment, partner brand cards, in addition to any of the default cards provided in the portable computer configuration, cannot be deleted by guests. The inability to remove these cards from the home view 420 prevents guests from inadvertently removing cards which are integral to the services provided by the partner, such as a room service menu in a hotel, or a search database in a library. Branded web cards may include cards that map to predetermined web pages selected by the partner. For example, a hotel partner may configure a web card that maps to the hotel's (or hotel chain's) website.

In one embodiment, in the partner configuration, the partner may also define one or more preferred channels to which the portable computer automatically returns when in the passive mode, outside of a session, after being left idle for a predetermined time period. The predetermined time period, for example, 1 minute, 5 minutes, etc., is set by the partner in the partner configuration. In one example, when the portable computer is being operated within a session, the portable computer remains on the last selected channel, giving full control to the guest to choose which channel they wish to display when the computer is idle. Outside of a session, however, the portable computer displays the preferred channel selected by the partner. For example, the partner may choose to show the welcome channel by default, to grab the attention of guests and immediately inform them of how to begin interacting with the device. In another example, the partner may prefer to display a slideshow, news channel, or a custom channel with pre-selected content. For example, a partner may set up a branded photo channel to provide a convenient way for the partner display their photos and other promotional material in a visually engaging manner. In another example, a partner may define a custom channels with custom channel content to serve specific purposes, such as a food service menu in a hotel, or a card catalog search in a library.

Individual photo channels may access photos stored in the cloud 410 under the partner's profile, or via an RSS feed to a photo storage web site. In one example, branded photo channels are defined by either a single URL for an RSS feed containing image content or a public link to an album on a supported photo service. The content for custom brand channels may be uploaded directly to the cloud 410 and stored under the partner profile. Custom brand channels, and the content associated therewith, are defined by unique channel identifiers. RSS news channels may also be branded. Channel cards may be associated with websites that include one or more RSS feeds. Accordingly, referring again to FIG. 5, in one example, the header 520 of a channel card 510 may include a channel source selector (not shown) that allows a user to select which RSS feed source to display when the channel is activated. In another example, the channel card will display a plurality of RSS items one at a time through the channel card, thus the content in a channel card periodically changes, until all content items have been displayed. At that time the channel cards starts again from the beginning displaying each one of the plurality of source items. In one example, branded news channels have a single source. Therefore, the channel source selector in the header 520 that usually appears for websites with multiple RSS feeds is omitted to ensure that the content chosen by the partner remains selected. Accordingly, in one example, branded news channels are defined by a single RSS feed URL.

According to one embodiment, the cards that appear in the default home view 420, and the order in which they appear, is defined by a card list specified in the partner profile. Since cards are a fundamental element of the portable computer user interface, choosing particular cards to show by default facilitates providing a useful and engaging experience for guests. The partner may define a list of cards that may then be used in one or more of their portable computer configurations. In one example, the portable computer configuration defines a basic list of the cards that appear in the default home view 420, and a list of cards defined by the partner is added to the basic list of cards, such that the union of these sets may be referenced from any of the partner's configurations. In one example, the order of the cards within the card list defines the default order in which the cards appear in the home view 420. In one example, the new web card always appears at the end of the list, and cannot be removed or repositioned. An example card list may include the following cards, for example: a weather channel card, a clock channel card, a first branded photo channel card, a branded news channel card, one or more branded custom channel cards, the home-page web card, one or more branded web cards, a second branded photo channel card, and a new web card.

According to one embodiment, defaults for the portable computer user interface, both within and outside sessions, are defined according to a cascading configuration system. As discussed above, partners may define one or more configurations. Each configuration may contain one or more configuration layers. Within a configuration with multiple layers, the lowest layer in the configuration overrides the higher layers, much like cascading style sheets. Table 1 below illustrates an example of how several configurations using shared configuration layers could be used within a hotel property to customize portable computers for distinct areas and rooms. In one example, the default "portable computer" configuration, defined by the portable computer service provide as discussed above, is always the highest layer. Therefore any cards and settings defined therein may be overridden by subsequent layers in the cascading configuration. While configurations and configuration layers provide a powerful system for managing several distinct groups of portable computers, many partners may find a single configuration with only one custom configuration layer to be sufficient for their needs. Accordingly, although multiple configuration layers may be provided, embodiments of the portable computers discussed herein do not require multiple configuration layers.

TABLE 1

| Hotel room | Hotel suite | Hotel lobby | Hotel pool | Hotel gym |
|---|---|---|---|---|
| 1 portable computer | 1 portable computer | 1 portable computer | 1 portable computer | 1 portable computer |
| 2 hotel | 2 hotel | 2 hotel | 2 hotel | 2 hotel |
| 3 room | 3 room | 3 lobby | 3 health | 3 health |
| | 4 suite | | 4 pool | 4 gym |

There are many variations on the above example of a cascading configuration system. Partners may add or remove configuration layers to customize portable computers for a variety of different locations or access levels. For example, a hotel chain might define several distinct "hotels" at the second layer, allowing each hotel to present specific, customized content, such as, for example, local news or sports information, specific restaurant or room-service menus, etc. The configuration system may also support a calendar so that, for instance, the configurations assigned to a specific set of devices can be changed between weekend and weekdays, or for special events. Custom channels included within the card list may accept one or more parameters that define the appearance and behavior of that channel in a specific context. Since these contexts may vary based on the configuration, the configuration provides a mechanism for specifying the channel parameters. As discussed above, embodiments of the portable computer 100 are heavily reliant on the Internet or some other network access to the cloud. According to one embodiment, since the majority of the data and programs used by the portable computers is stored in the cloud 410, the portable computers require a network connection to function, and therefore a default network setup may be required as part of the configuration process. In one example, every configuration contains at least one configuration layer which defines a chosen network for the portable computers to access.

Various settings of the portable computers may also be defined in the configuration process. For example, settings available to be defined may include parameters which directly affect the behavior of the portable computers, such as the delay before which the portable computer automatically ends a session, or the default channel to display in passive mode. In one example, the following specific settings are defined: a time period for automatic session sign-out, the duration spent idle before a sign-out prompt appears, the home-page URL, and a URL defining the default page shown when a new web card is created.

Each configuration may enable ("add") or disable ("remove") cards defined within the card list. In one example, this process is akin to flipping a visibility switch on the card, as opposed to literally adding or subtracting cards. If multiple configuration layers within a given configuration enable the same card, that card only appears once within home view 420. In one embodiment, cards defined within the card list are all assumed to be disabled by default within any configuration. Accordingly, if no configuration layer explicitly enables that card, it will not appear within the home view 420 on any portable computers assigned to that configuration. The opposite scenario, i.e., all cards being enabled by default, may alternatively be implemented. By default, the positions of the cards are defined by the order of the card list, as discussed above. However, configurations may override the position of the cards by assigning them a relative position. In one example, the relative position is any non-negative integer. Cards are ordered according to their relative position, with lower numbers, for example, appearing first in the home view 420. If multiple cards are assigned the same relative position they appear adjacent to each other in the home view 420 in the order that they appear within the card list. In one example, cards appear in the home view 420 in the following order: first, all cards with explicit relative positions specified within the cascading configuration, in increasing order, and according to their order in the card list when multiple cards have the same relative position in a given configuration; second, all cards without explicit relative positions, according to their order in the card list; and lastly, the new web card. Thus, a card with a relative position of 999 will appear before all other cards in the card list if the other cards are not assigned relative positions in the configuration. In one example, the new web card always appears last.

The configurations and settings defined by the partner under the partner profile define the default look and feel of the partner's portable computers, and their behavior outside of a session. Within a session, a guest may add new cards, rearrange cards within the home view 420, and interact with the portable computer in a variety of ways, as discussed below. However, when a guest's session ends, the portable computer always returns the default configuration set up by the partner.

As discussed above, the portable computer 100 may operate in the passive mode in either the laptop mode or the easel mode. Some partners may prefer to initially configure the portable computer 100 into the easel mode when placing it in a public space, since the footprint of the device is smaller in easel mode and the appearance of the device may be more pleasing. Guests may be unfamiliar with the portable computer, particularly when it is configured in easel mode. Accordingly, in one embodiment the portable computer is configured to display a "basics" channel when a user initiates interaction when the portable computer is in the passive mode outside of a session. Displaying the basics channel may occur, for example, when the portable computer is picked up, the scroll wheel is moved, or a key is depressed. In one embodiment, the basics channel contains a brief welcome message and instructional information, such as, for example, a diagram informing the user how to configure the device from the easel mode into the laptop mode, and vice versa. The basics channel may also display information instructing the user how to access the web and other services. The basics channel may also be available as a channel card in the home view 420 when the portable computer is in the active mode within a session. In this instance, selecting the basics channel card "opens" the channel and provides information such as for showing the guest how to enter the passive mode to view their selected content in a passive, TV-like experience. According to one embodiment, a parameter associated with the basics channel specifies whether or not network access is offered by the partner for free or for a specified payment, and the basics channel may display a message informing the guest of network access options. Network access and options for access are discussed in more detail below.

According to one embodiment, when a guest user begins to interact with the portable computer, and thus the computer enters active mode, a first screen that is displayed to the guest is a "welcome" screen. The welcome screen provides a portal through which a guest may initiate a session, and serves to introduce the portable computer to the guest. The welcome screen may also display any necessary or desired legal disclaimers or agreements defined or selected by the partner. The welcome screen may be displayed continuously when the portable computer is not in use, or may be displayed responsive to an event. In one embodiment, the welcome screen is part of the basics channel in the passive mode. In one example, the welcome screen appears automatically after a predetermined time period (e.g., 30 seconds or 1 minute) from when the basics channel is accessed in the passive mode. In another example, the basics channel may include a "welcome" icon that, when clicked by a guest, causes the portable computer to display the welcome screen. Alternatively, the welcome screen may appear responsive to the guest rotating or pressing the scroll wheel, or another input device, when the portable computer is displaying the basics channel and is in the passive mode. According to another example, the welcome screen may appear automatically when the portable computer is configured from the easel mode into the laptop mode, outside of a session. As those skilled in the art will appreciate, given the benefit of this disclosure, there are many mechanisms and options by which the welcome screen can caused to be displayed, and embodiments of the portable computer are not limited to applying any one particular mechanism.

Figure 7:
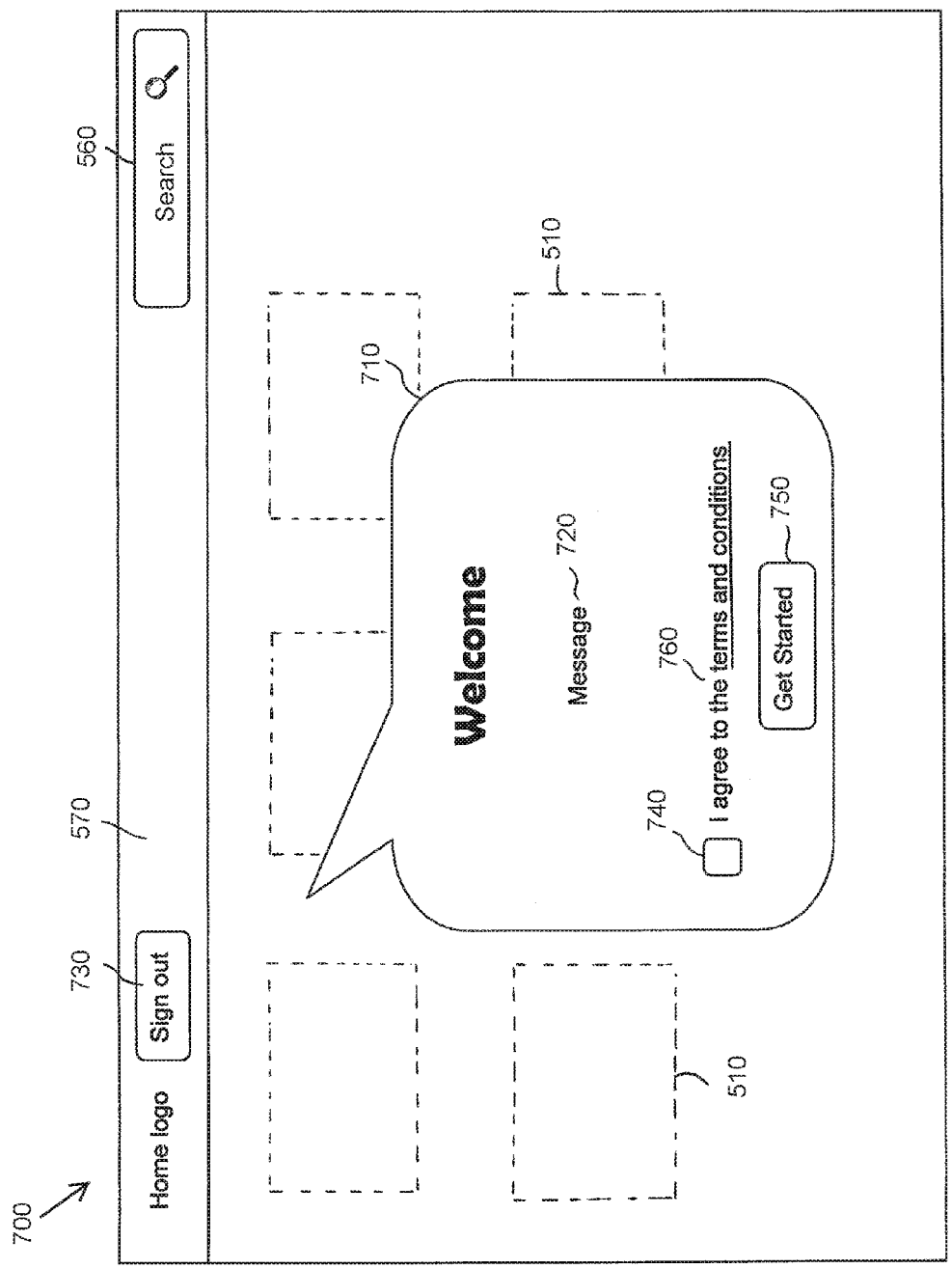
FIG. 7 is a block diagram of one example of a welcome screen of a user interface for a portable computer according to aspects of the invention.

Referring to FIG. 7, there is illustrated a block diagram illustration of one example of a welcome screen. The welcome screen provides a starting point for guests who may be unfamiliar with the portable computer and its user interface, while allowing those who are familiar with it to access the user interface quickly and easily. Accordingly, the welcome screen 700 may include a welcome "bubble" 710 or other prominent text (including message 720) that identifies the portable computer and as a simplified web computer and instructs a guest on how to initiate a session. In one example, the welcome bubble 710 may include an image selected by the partner, for example, an image associated with the partner's brand. The message 720 may also point out a "sign out" button 730 in the header 570, and inform the guest that they can click it at any time to end their session and erase any trace of their use of the portable computer. In one example, the welcome screen 700 may be a version of the home view 420 discussed above, and the welcome bubble 710 may appear over a plurality of "grayed-out" cards 510 that would become fully visible in the home view after the guest initiates a session. In this example, the search bar 560 may also be shown "grayed-out" in the welcome screen.

In one example, the welcome bubble 710 includes a checkbox 740, unchecked by default, and requires the guest to agree to the terms of service of both the portable computer service provider and the partner before being able to initiate a session. The welcome bubble 710 may also include a "get started" or similar button 750 which the guest may click to initiate a session. In one example, the "get started" button 750 is disabled until the checkbox 740 is checked. In one embodiment, while the full terms and conditions agreement is hidden away so as not to intimidate guests, a link from within the checkbox label 760 provides a way to access the complete text inline before entering a session. In one example, the terms of service replace the contents of the welcome bubble 710 in a scrolling view, below which "Decline" and "Accept" buttons may appear. Both of these buttons may return the guest to the initial welcome screen 700, with the "Accept" button also implicitly checking the checkbox 740. This behavior ensures that even if a guest enters the terms of service and then leaves the device, the next guest to arrive will still see the initial welcome screen. In one example, if the terms of service screen is left idle for more than a preset period of time, for example, 60 seconds, the portable computer may assume that the guest has left, and the welcome screen may return to its default state. When a guest clicks the "get started" button after agreeing to the terms of service, the welcome screen may fades out to reveal the home view 420 beneath, and the guest's session is initiated.

According to one embodiment, when a guest session is initiated, a guest profile is created in the cloud 410 under the control of the portable computer service provider. The creation of this guest profile allows the guest to modify the home view 420 by adding cards, select channels, access web pages, and various other activities within a session, as discussed further below. In one embodiment, at the end of the session, the guest profile is erased, thereby preserving the guest's privacy and returning the portable computer to its default configuration in preparation for arrival of the next guest. In another embodiment, the guest profile is persistent and linked to the partner. For example, for hotels that offer rewards programs, a guest profile may be associated with the guest's rewards program membership number. In this example, the welcome screen may include a checkbox or other interface item that allows the guest to identify his/herself as a rewards program member and enter his/her membership number. If the guest chooses this option, a new guest profile may be created and associated with the membership number for new guests, or for returning guests, the guest is "logged-in" to their existing profile. This allows guests to configure the portable computer and, when they return to the same hotel, hotel chain, or other partner location, to access their existing profile which contains the configurations the guest has previously made. In another embodiment, guests who have a private portable computer from the portable computer service provider may access their existing profile associated with the guest service provider, and the portable computer will be automatically configured according to the guest's profile and therefore resemble the guest's own portable computer.

Figure 8:
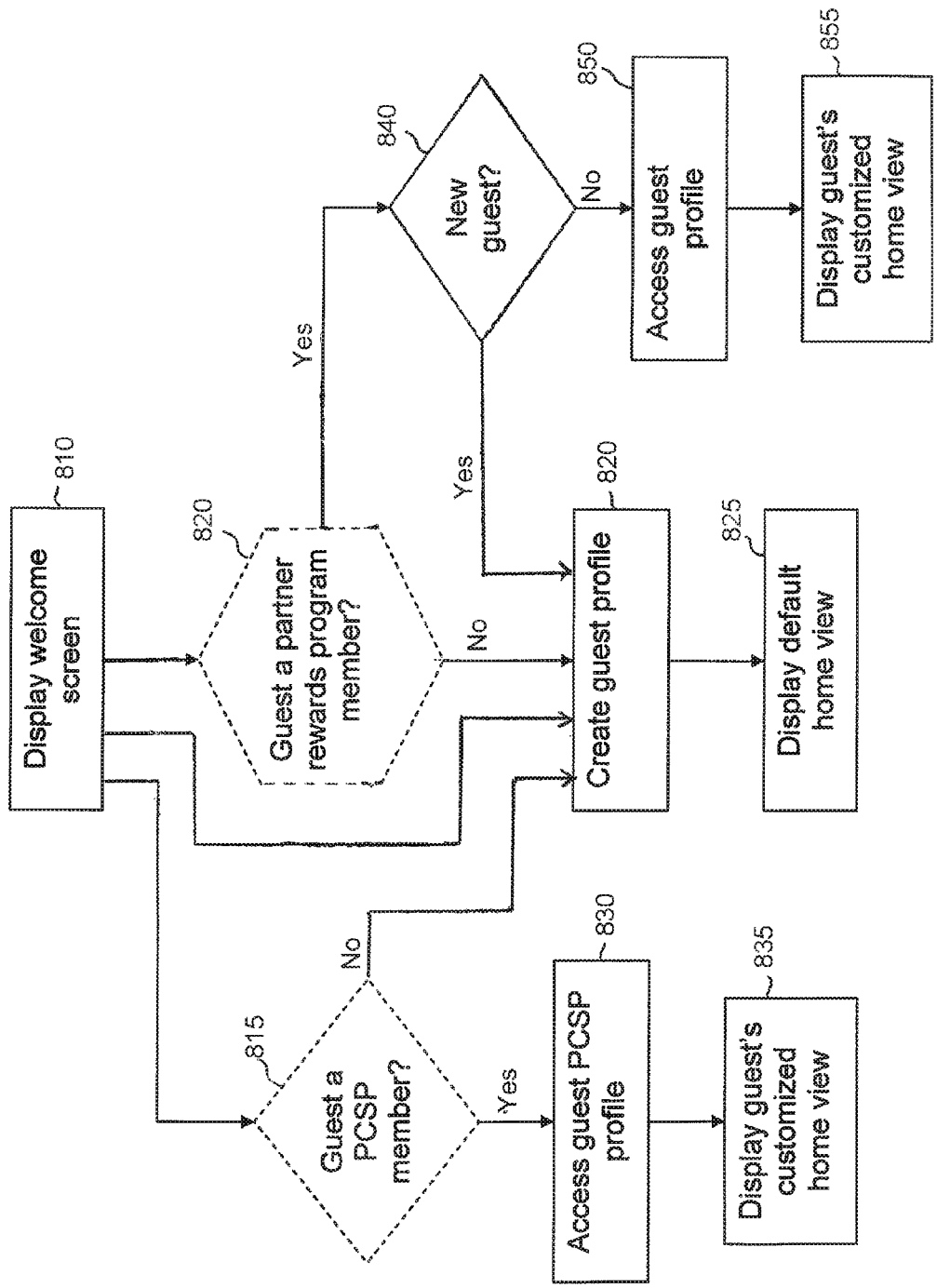
FIG. 8 is a flow diagram of one example of initiating a guest session on a portable computer, according to aspects of the invention.

Referring to FIG. 8 there is illustrated a flow diagram of one example of initiating a guest session on a partner's portable computer. In a first step 810, the welcome screen is displayed. The partner may optionally configure the portable computer to display login options, either as part of the welcome screen, or as a separate screen that appears after the guest clicks the "get started" button 750. These login options may include querying whether or not the guest is already a member of the portable computer service provider (PCSP) community (step 815), and/or querying whether or not the guest is a member of the partner's rewards program (step 820). It is to be appreciated that the term "rewards program" as used herein is intended to refer generically to any loyalty program, preferred customer program, or other membership program offered by the partner, not limited to programs actually offering rewards. These login options may be offered together, or sequentially. If no additional login options are offered by the partner, or if the guest indicates "no" to either or both queries (depending on what options are offered by the partner), the portable computer will proceed directly to the default home view 420 (step 825) and create a transient guest profile (step 820), as discussed above. It is to be appreciated that steps 820 and 825 may be performed in either order or simultaneously.

If the guest indicates that they are a member of the portable computer service provider community, the guest may be requested to identify him/herself to the device by entering a user name and password. Once the user name and password are accepted, the guest's profile in the cloud will be accessed (step 830). Instead of displaying the default home view 420, the portable computer may instead display the guest's personal, customized home view (step 835) retrieved from the guest's profile. Remote storage in the cloud 410 is accessed to retrieve the guest's profile. Changes to profile may be copied to the remote location or changes in the profile may be retrieved from the remote location. If the guest indicates that they are a member of the partner's rewards program, the portable computer may determine whether or not the guest is a new guest (step 840), meaning that the guest has not accessed one of the partner's portable computers before, or whether the guest is a returning guest who already has a guest profile associated with their rewards program membership number. If the guest is a returning guest, the guest's existing profile may be accessed (step 850), and the home view will be displayed including any configurations which the guest has previously stored in their profile (step 855), as discussed further below. If the guest is a new guest, a guest profile will be created (step 820) and the default home view is displayed (step 825).

Figure 9:
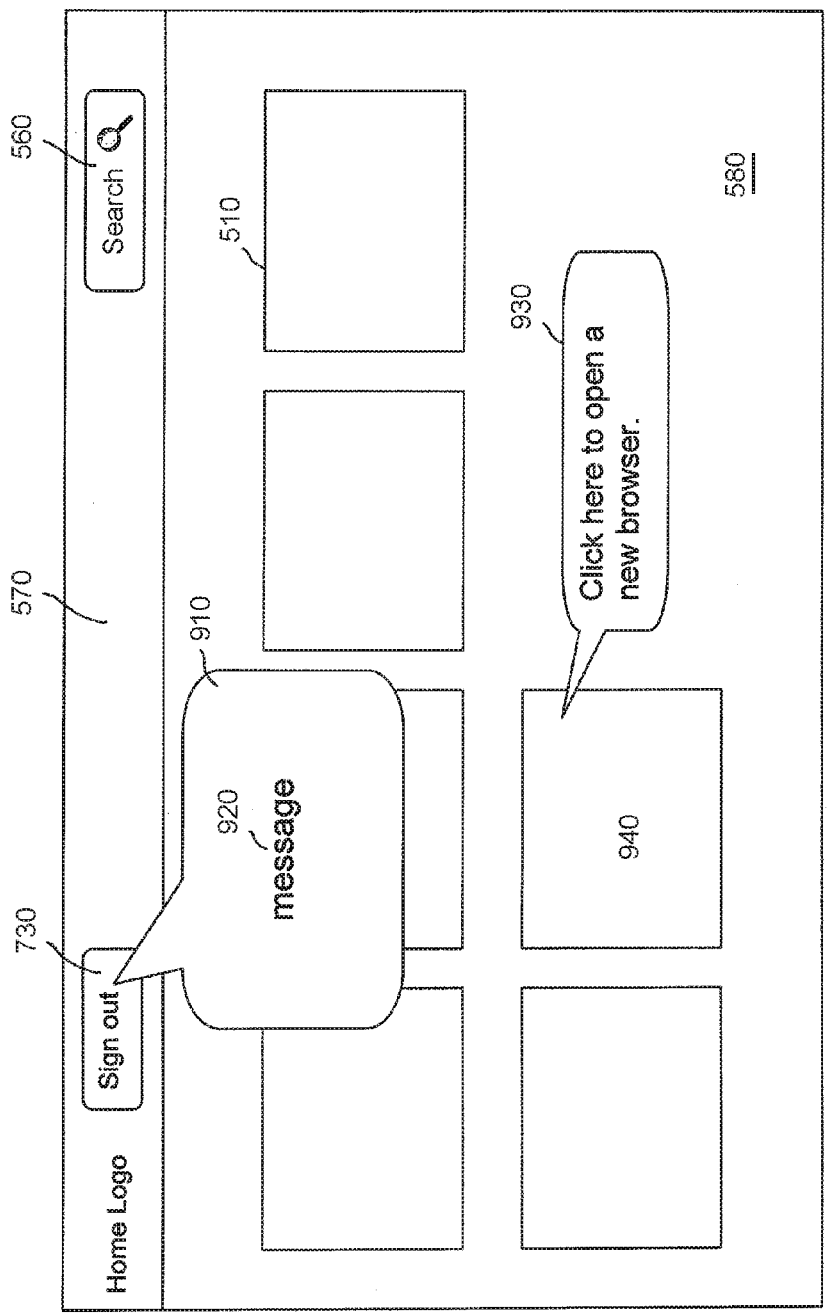
FIG. 9 is a block diagram of one example of a home view screen with instructional bubbles, according to aspects of the invention.

According to one embodiment, since the portable computer user interface may be new to many guests, the home view may be configured to initial display one or more instructional bubbles to point out important features in the interface to guests. For example, referring to FIGS. 7 and 9, after a guest clicks the "get started, button 750 and the welcome screen disappears to reveal the home view 420, a transient dialog bubble 910 appears from the "sign out" button 730, with a message 920 telling the guest to click this button when they are finished using the portable computer. The message may also inform guests that their session will end automatically after a certain time period, or other event occurs as discussed further below. An instructional bubble 930 may also appear over the new web card 940 informing guests that this is the card to use to open new web pages and create new cards, as discussed further below. Other instructional bubbles may appear at various stages within a session to inform guests of available features or options, for example, how to return to the home view from another view, or how to access or create a channel, etc. As discussed above, outside a session, switching from the passive mode to the active mode may reveal the welcome screen shown atop a dimmed home view. In contrast, within a session switching between the active and passive modes preserves context by keeping the guest within the channel they switched from.

In one embodiment, rather than initially populate the home view with many channel cards, the partner may instead opt to use a "channel store" card. The channel store card is a card that when selected by the guest displays a list of channels available to the guest. Optionally, the list of channels may include a small image relevant to the content of the channel. A guest may select any channel(s) in the list, and upon selection, a channel card corresponding to the selected channel appears in the home view 420. The channel store may be useful to assist guests in finding and adding channels even during transient usage; and allows the initial home view presented to the guest to remain simple and uncluttered. In one embodiment, the partner may define which channels are available free of charge versus which channels are offered for a fee. For example, channels containing promotional information may be offered free of charge, whereas the partner may choose to charge for channels that stream Internet TV. In one example, "for charge" channels may only be accessed within a session where the guest has already elected to pay for network service as part of the sign-in process; whereas free channels may be access outside of a session. In another embodiment, generally only free channels may be offered to guests; however, for-charge channels may be offered to guests who log-in via the partner's rewards program or as existing members of the portable computer service provider community, as discussed above with reference to FIG. 8. According to one embodiment, the user interface is configured to prevent any channels accessible from outside a session from accepting any personal information from guests. This may also be implemented within a session for guests who are not members of the portable computer service provider or rewards program members. In one embodiment, custom channels set up by the partner, as discussed above, can be configured (through the parameters associated with the channel) to prevent personal information from being gathered from guests outside a session, while enabling such functionality for guests who have already agreed to the terms of service.

As discussed above, within a session, the home view may be configurable by the guest. The guest may add new cards, and in some instances delete cards. As discussed above, certain cards, such as the default cards set up by the portable computer service provider and the partner's branded cards may not be deleted by the guest. Accordingly, in one example, a guest is only able to delete cards that the guest has previously added during a session. In one embodiment, the guest may re-arrange cards, optionally including some of the default cards and/or partner branded cards, even though the guest cannot delete these cards. According to some embodiments, the new web card is further limited in configurability in that the positioning of the card will not change relative to the other cards. For example, the new web card will always be displayed last. In other embodiments, even the new web card may be reorganized in the home view by the guest.

In one embodiment, the guest may rearrange the cards in the home view using "drag and drop" procedures commonly used in computer user interfaces. Drag and drop operations may be associated with a drag threshold. In one example, a drag threshold is applied to require a small movement of the identified card before the portable computer executes the drag operation. The drag threshold may be measured on the order of pixels, and may be any number of pixels that prevent accidental dragging in response to the user attempting to click on a card. In one embodiment, the drag threshold is set to 5 pixels. Other thresholds may be used, for example, 2, 3, 4, 6, . . . pixels, etc. If a guest depresses the button control (e.g., on a mouse, touch pad or the scroll wheel) and does not release, the guest may user drag and drop the selected card within the home view. The card may be dragged across pages of the home view, and the guest may reorder the presentation of cards in the home view using multiple drag and drop operations. According to one embodiment, as a card is dragged across the home view, all displaced cards will appear to move into new places.

Figure 10:
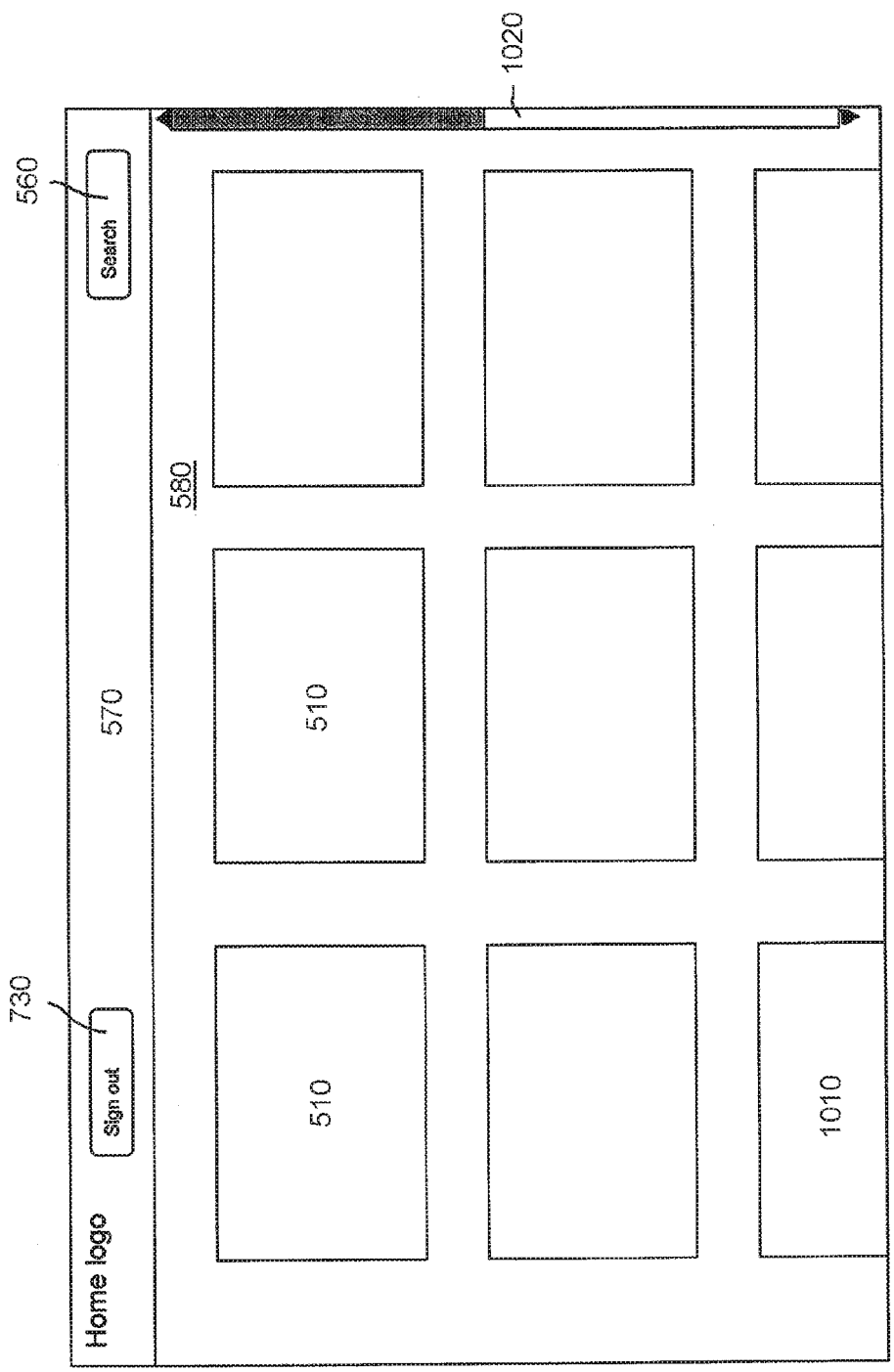
FIG. 10 is a block diagram of one example of a multi-page home view screen, according to aspects of the invention.

In some instances, the guest will add a sufficient number of new cards that not all the cards will fit on a single page of the home view 420. Accordingly, the home view 420 may span multiple pages. Referring again to FIG. 10, in one embodiment, for home views which include multiple pages, a hint or cut out of adjacent cards are rendered at 1010, for example. Hints or cut outs 1010 of adjacent cards may occur at the bottom of the display screen, the top of the display screen, and both top and bottom, where multiple adjacent pages are present. A scroll bar 1020 may be provided to allow the guest to scroll through the multiple pages of the home view 420. In one embodiment, the body 580 of the home view 420 is associated with a maximal display threshold. The maximal display threshold governs the number of cards 510 displayed per home view page. The portable computer generates a new page display for the home view 420 in response to the number of cards 510 exceeding the maximal display threshold.

As discussed above, one of the default cards 510 included in the home view 420 is the new web card 840. In one embodiment, the portable computer service provider provides a template for the new web card 840 designed to host links to multiple websites, for example, websites related to the homepage website, and services from within the new web card. When a partner chooses to use this template for the new web card, the partner may specify a number of unique bookmarks, for example, 2-6 bookmarks, that appear in a grid within new web cards, pointing guests to useful and relevant information. In one example, each bookmark is specified with the following information: a URL; a title, and an image. The URL is the URL of the website to which the new web card initially points to, which is loaded when then bookmark is clicked by the guest. The guest may then modify this URL, for example, by typing in a new URL, to configure the new web card into a guest custom web card. In one example, when a guest creates and saves a web card, a replacement new web card is automatically generated and appears at the bottom right corner of the home view 420. The title is a short title that accompanies the bookmark image, identifying its content. The image is a still PNG image that represents the bookmark within the grid.

New cards may also be created during a browsing session. For example, if the guest clicks an "open in new window" link on a web page, or executes a keyboard shortcut (e.g. Shift-click) to perform the same function, a new card may be generated. In one example, responsive to any of these actions, the system shows an animation zooming out of the current card to the home view, where the "new web card" 940 may slide out of the way, revealing the new card in its place, and finally zooming into the new card. In one example, this animation may take no more than about half a second.

According to one embodiment, a guest may select a card 510, and thereby access the content associated with that card, by clicking the card. In one embodiment, clicking a card causes the card to expand to provide an enlarged view, optionally over a background of the home view or another background image, or even a full-screen view of the card. Alternatively, at least for certain cards or types of cards, clicking the card directly accesses the content associated with that card, for example, opening the web page corresponding to a selected web card, or displaying the channel associated with a selected channel card. The guest may also see options and configurability associated with the card 510 by "focusing" on the card. Computer focus is intended to include any identification by the computer system of the card, short of execution of the mapping associated with the card. For example, focus should include identification by tabbing through available cards, identification by using hotkeys, among other options that result in computer focus resolving on the card. One example of computer focus includes "hover," which indicates the movement of a pointer, typically represented by a white arrow on the computer system display, over a card. Focus may be resolved on a computer system by analyzing content intended to be displayed before its display on the computer system, additionally focus may be responsive to actions taken on the display through for example pointing devices. The terms computer focus and focus are intended to be read to include hovering over a screen element, tool, or other visual representation displayed on a computer system display. In one example, focus follows a displayed pointer, and movement of the pointer with, for example, a mouse causes the computer system to resolve computer focus on the visual object under the pointer display. Selection by a user or a computer system may include focus and visual objects displayed on a computer system display may be selected by moving a displayed pointer. In some embodiments, selection may be accomplished by clicking on a visual object using a pointer displayed on the computer screen. A second "click" may then cause the computer system to execute functionality associated with the visual object. Execution is intended to be read to include initiating an operation associated with a visual object, such as a card or button. In one example execution will include clicking on a visual object (single or multiple "clicks"), by positioning a pointer display over the visual object and depressing a button to initiate the operation.

According to one embodiment, when cards 510 are displayed in the home view 420, minimal information is displayed in the header, so as not to clutter the small card; however when the card appears in a hover state, additional options/tools are displayed in the card header. In one embodiment, when the card appears in the hover state, the card header may include tools for providing easy access to computer functionality associated with the card. For example, the options bar 550 may not appear in the card header generally, but may appear when a guest hovers on the card. In one example, in response to focus on a card the display of the card becomes a little larger relative to its display when out of focus, and the card options bar 550 and/or other information is revealed in the header 520 when the card is in a focused state. In one example, hovering on the options bar reveals a "drop-down" menu from which the guest may select various options for the card, as discussed further below. In another example, the options bar 550 is clickable, and clicking the options bar may cause an animation displaying the flipping over of the card and the revealing of user-selectable options on the "back" side of the card. In one embodiment, the first time a guest enters a focus view of any card during a session, a transient dialog bubble appears from the home logo icon, for example, to inform the guest of how to return to the home view.

Figure 11:
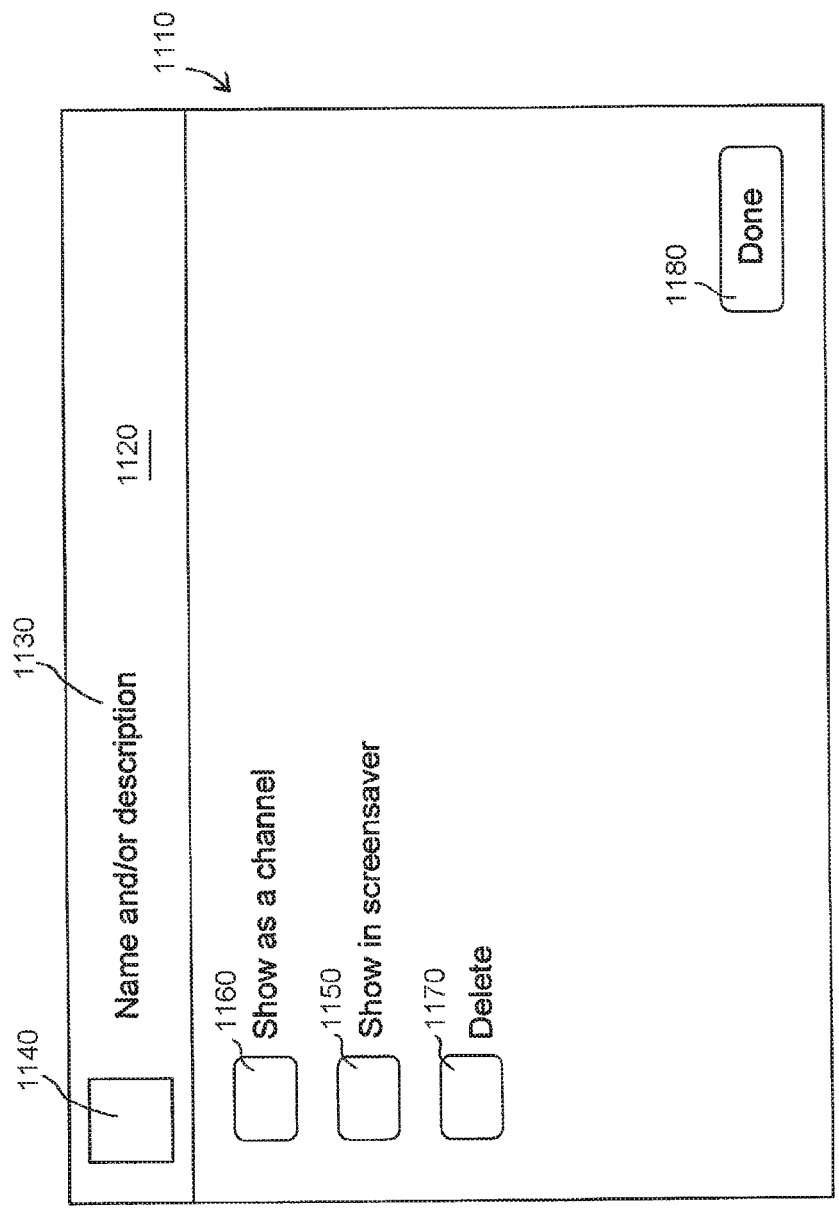
FIG. 11 is a block diagram of one example of a focus view of a card according to aspects of the invention.

Referring to FIG. 11 there is illustrated a block diagram of one example of a back side of a card 1110 displaying various options for the card. The back side of the card 1110 may also include a header 1120 in which the name or a brief description 1130 of the card is displayed, optionally along with an image or icon 1140, to identify the card to the user. Options may include, for example, permitting the content reflected in the card to be displayed as a screen saver, or deleting the card. Certain features may only be available for certain types of cards. In one embodiment for example only channel cards may be displayed in the screensaver mode, thus only channel cards will display the screensaver option 1150 to permit display in screensaver. In another embodiment, certain card types may be converted through user selection into different card types. For example, in one embodiment, web cards may be converted into channel cards, and therefore web cards may include a conversion option 1160. The selection of the "show as a channel" option 1160 causes the portable computer to execute functionality that transforms the web card into a channel card. In one embodiment, the transformation may only be made for a web card that references a content including an RSS feed or for which customized visualizations are available. Channel cards that have been created from web cards may include an option (not shown in FIG. 11) to convert the channel card back into a web card. In one embodiment, cards that are created by a guest during a session include a delete option 1170 that removes the card from the home view 420. As discussed above, the delete option may be unavailable for any default cards or partner branded cards. A "done" or similar button 1180 may be provided to allow the user to return to the front view of the card or home view.

According to one embodiment, when a session ends, the portable computer is reset to its session defaults. This erases any and all history of the session, restoring the default cards and settings. Ending a session may include, for example, clearing all cookies and web history, restoring all default cards, removing any cards added by the guest, resetting the volume on the portable computer, resetting the screen brightness on the portable computer, resetting the screensaver to the partner-selected default, and entering a power saving mode. Once the session defaults have been fully reset the welcome screen appears, ready for the next guest to arrive. In one embodiment where the guest is a rewards program member or member of the portable computer service provider community, as discussed above, although the portable computer is reset to its default configuration, changes to the configurations saved under the guest's profile may be retained under the guest's profile such that when the guest next accesses their profile their updates are available to them. Sessions may end in one of two ways, namely, either by an explicit action on behalf of the guest, or following an idle timeout.

As discussed above, in one embodiment, the header of the home view includes a "sign-out" button 730 to end the session. As discussed above, placement of the "sign-out" button 730 within the header 570 keeps it persistently available so that the guest may never get lost without a way to end their session. In one example, on hover, the "sign-out" button 730 turns red to indicate that it will end the guest's session. Once the "sign-out" button 730 is clicked, the portable computer returns to the home view automatically and the welcome bubble fades back in atop the user interface. The bubble may contains a message thanking the guest for using the portable computer, and letting them know that the device is been cleared of their personal information. In one example, the portable computer is configured to execute a visual animation of the session ending. For example, the cards in the home view all fall off the screen to visually emphasize the point of the guest's information being erased, and a progress bar is displayed while the portable computer finishes the reset process. The default cards for the first page of the home view begin appearing as the progress advances. Once the reset is complete, the bubble returns to the default welcome screen state, ready for the next guest to arrive. In one embodiment, although portable computer sessions are not equivalent to traditional sign-in and sign-out systems since no user name or password may be required, guests may be familiar with these terms and already understand the concept of "signing out" to erase their history and reset the device for others. Therefore, the term "sign out" is used on the button which ends the session to retain the conceptual familiarity and provide a corresponding sense of security.

Although many guests may end their sessions explicitly, the portable computer may also be configured to end sessions after a predetermined time period of inactivity to protect guests' privacy as well as to ensure that the portable computers are ready for new guests. The duration of the time period before which the session will end automatically may vary greatly based upon the location and circumstances in which the portable computer is used. In a hotel room, for instance, the usage of the portable computer will generally span a full night, and therefore the portable computer may wait several hours before implicitly ending a session. In crowded public spaces such as coffee shops, on the other hand, the delay may be as little as a minute. The delay may be chosen in conjunction with the partner. In one example, after the portable computer has sat idle for the specified delay period, a dialog bubble appears to query whether the guest has finished using the portable computer and displays a countdown, for example, a 30 second countdown. If no action is taken, the portable computer automatically ends the session at the end of the countdown. However, the guest may prevent the session from ending by clicking the dialog bubble, for example, which resets the idle timer and restores the previous view the guest has selected. In one embodiment, the portable computer is configured to override the idle timer under certain circumstances. For example, if the guest is watching a movie, the guest may not touch the portable computer, which may appear idle; however, the portable computer can override the idle timer so as not to end a session during a movie, or similar type of activity.

According to another embodiment, a guest may suspend the portable computer by closing it. After this occurs, there is no guarantee that the same guest will later return to the portable computer and wake it. Accordingly, session may be ended implicitly immediately following wake to prevent another guest from arriving an accessing the portable computer in a previous guest's session, compromising that guest's security and privacy and interfering with the new guest's own intended guest experience. Following wake, the dialog bubble confirming active use may be skipped altogether, with the portable computer implicitly ending the session and restoring the defaults as quickly as possible. In one embodiment, this process happens as part of the waking process, before anything is shown on screen, so that the first visual displayed is the welcome screen. Similarly, if the portable computer is shut down, the first screen that appears when the portable computer is booted up is the welcome screen. The portable computer may be configured such that, after boot up, the welcome screen is displayed for a predetermined time period, after which the portable computer displays the partner's selected preferred channel(s) in the passive mode.

Figure 12:
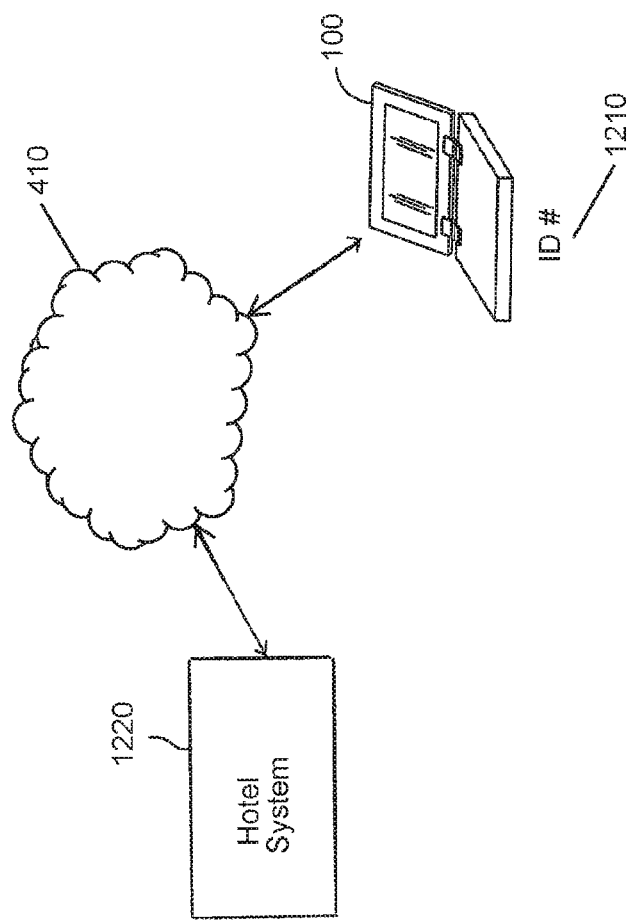
FIG. 12 is a functional block diagram of one example of a computer network system according to aspects of the invention.

According to one embodiment, in a hotel environment, the "time-out" period, and optionally other settings, of portable computers located in hotel rooms can be linked to guest check-in and/or check-out information. Referring to FIG. 12, in this example, each in-room portable computer 100 may be provided with a unique identifier 1210 such that specific information can be communicated to the portable computers via the cloud 410 from the hotel's computer system 1220. For example, when a guest checks in to a hotel, the hotel system 1220 may transfer information to the portable computer 100 located in the guest's room. This information may include, for example, if the guest is a rewards program member, the guest's rewards program number such that the query step 820 can be skipped during the process of initiating a session (see FIG. 8) and the portable computer automatically accesses the guest's rewards program profile and makes available all additional functionality associated therewith (such as offering for charge channels, as discussed above) when the guest initiates a session on the in-room portable computer. The information may also include the duration of the guest's stay, such that the idle timer on the in-room portable computer may be set to automatically end a session at the hotel's designated check-out time on the day the guest is scheduled to leave. In another example, a check-out feature can be offered, either as a dedicated channel or as part of a hotel services channel, to allow the guest to check-out of the hotel via the portable computer 100. In this example, the portable computer 100 transfers the guest's check-out information, including any charges for pay-channels and/or other services purchased via the portable computer, to the hotel system 1220. Upon confirmation of the guest's check-out, the portable computer 100 automatically ends the session and may display the session ending visualizations discussed above. In one example, the portable computer displays a dialog bubble when the guest selects the check-out option to warn the guest that their session will be automatically terminated upon completion of the check-out procedure.

As discussed above, partners may include one or more custom channels within each of the one or more configurations and/or layers they define. At least one of these custom channels may include a promotional channel that provides advertising and optionally offers items and/or services for purchase to the guests. Promotional content may be varied based on the a variety of factors including, for example, the location of the portable computers, environmental information provided to the portable computers via the cloud, partner-specific information, such as the status of various services offered by the partner, and guest information. For example, in the hotel context, promotional content may be selected based on the configuration layer of the portable computer (e.g., its location with a hotel room, lobby or other area), environmental information, such as weather information, news, or information regarding local events, obtained via the cloud, and knowledge of the guests' status as guests of the hotel. Thus, as discussed above, promotional advertising and/or offering of services is dynamically variable and contextual based on multiple context dimensions, including location, environment and guest status. By contrast, conventional advertising is generally either not dynamically variable in the short term (e.g., a static billboard, poster or bulletin) or based on only a single context dimension, such as location for example.

Figure 13:
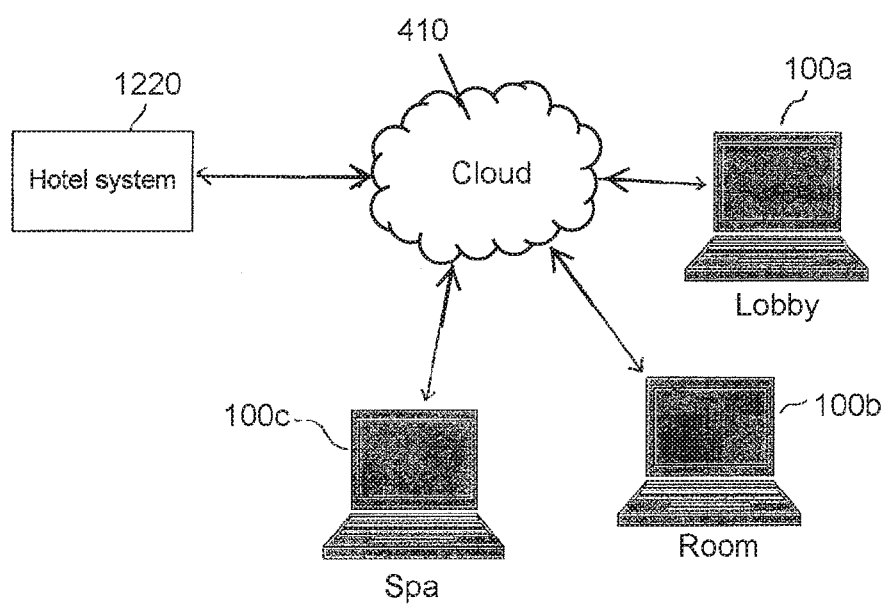
FIG. 13 is a functional block diagram of another example of a computer network system according to aspects of the invention.

Referring to FIG. 13, there is illustrated an example hotel network including the hotel system 1220 connected to portable computers corresponding to three different configuration layers, namely a lobby configuration 100a, a room configuration 100b and a spa configuration 100c, via the cloud 410. It is to be appreciated that any configuration layer may include multiple portable computers; therefore, portable computers 100a, 100b and 100c are intended to be representative of all the partner's portable computers, within a given location, having that configuration layer. Similarly, the system may include more or fewer than three configuration layers. Accordingly, the illustration of FIG. 13 is intended to be a non-limiting example only. The hotel system 1220 may have information include, for example, reservation information, hotel restaurant availability, spa services availability, etc. This information, or parts thereof, can be communicated to some or all of the portable computers 100a-c and used to change the promotional advertizing and/or services displayed by the portable computers. For example, if the hotel system 1120 determines that there is significant spa service availability during a given time period, the hotel system may communicate this information to the portable computer system in the cloud 410, which may then configure the portable computers 100a-c to display an offering of a discount for select spa services during the given time period. Similarly, availability information may be used to offer discounts in the hotel restaurant.

Promotional content may also be varied based on time. For example, after a certain time (e.g., 9 pm or 10 pm), the promotional content may highlight the hotel's late-night room-service menu, or early in the morning, the promotional content may highlight the breakfast menu. Promotional content may also be varied based on calendar days, days of the week (for example, weekday content may be different from weekend content), holidays, seasons, historical days or special event days.

According to one embodiment, promotional content may be varied on individual in-room portable computers based on specific guest information. For example, referring again to FIG. 12, if a guest purchases a certain item or service via the in-room portable computer 100 with a unique identifier 1210, information of that purchase can be provided to the hotel system 1220, which may then update the promotional content for that specific portable computer to offer that guest related items or services. For example, if a guest purchases a spa treatment, the promotional content of the portable computer may be updated to offer the guest discounts on spa products. In another example, the guest's profile may provide information regarding services the guest has used previously, or events or activities the guest has previously participated in, and the promotional content may be varied to offer these or similar or related services/activities to the guest. Promotional content may also be varied according to events, sales or special offers being offered by the partner facility and/or nearby or related businesses to encourage guests to participate in such events and visit the promoted businesses. In another example, if the hotel is hosting an event with availability, the promotional content may be updated to invite guests to attend the event. Promotional content may also be varied based on a guest's status as a rewards program member. For example, the guest may be offered a variety of items, services or discounts that can be "purchased" using the guest's rewards points. Thus, the hotel system 1220 may work cooperatively with the portable computer system managing the partner profile to dynamically update the promotional content displayed by individual portable computers or groups of portable computers (e.g., all those with a given configuration layer) in one or more channels.

In one embodiment, the portable computer system may be configured to connect to and/or obtain information from a guest's personal digital network, such as TWITTER, FACEBOOK, instant messaging applications, or other applications that provide information regarding the location and/or status of the guest. For example, the guest may connect to their personal digital network(s) via the cloud 410 using the portable computer 100, and the portable computer may be configured to use information provided by the guest in the personal digital network to update or change promotional content offered to the guest. Promotional content may further be varies based on the digital content accessed by the guest on the portable computer. For example, if the guest uses a web card to access a particular website, the portable computer may vary the promotional content based on the type of website accessed by the guest through the web card. Similarly, if the guest uses a channel card to watch live TV, the promotional content may be changed based on the TV channels/programs selected for viewing by the guest.

According to another embodiment, the portable computer systems uses environment and/or location-based information obtained from the Internet, along with guest status information, to update the promotional content displayed by the portable computers. For example, an in-room portable computer 100b may "know" that any guests using it are very likely to be guests of the hotel, and therefore travelers. As discussed above, the portable computer may include a weather channel that receives local weather information via an RSS stream. Accordingly, for example, the portable computer system may know that it is raining at a given location and that travelers are unlikely to pack an umbrella, and therefore may configure the promotional channel to offer an umbrella to the guest, for example, by informing the guest that umbrellas are available from the hotel lobby or gift shop, or by allowing the guest to purchase an umbrella through the portable computer 100b. The portable computer system may also monitor which services/items are most frequently selected by guests, and highlight those services/items in the promotional content. Thus, the promotional content is dynamically variable based on location/environment as well as guest status, and the system is able to offer the most relevant advertizing or services to particular guests at any given time.

According to one embodiment, one or more channels are configured to allow the guest to purchase viewed content directly though the portable computer. For example, as discussed above, the guest may be able to purchase offered items, such as the umbrella in the example above, or items associated with the hotel such as spa services. Guests may also be able to purchase items of the room-service menu (if it is included in a channel provided by the partner). In one example, purchases may be made in accord with conventional on-line purchasing arrangements. For example, the guest may "click" items to place them in a "cart" and then follow a check-out procedure in which the guest enters information to pay for the items. For example, the guest may enter credit card information, or rewards points. In one example, purchasing may be linked to the guest's reservation with the hotel, such that purchased items are added to the guest's bill (through communication via the cloud between the portable computer and the hotel system as discussed above), obviating the need for the guest to enter any billing information to make the purchase. In another example, rather than having a "shopping cart" arrangement, guests may obtain offered items/services through a "one-click" ordering system. Specifically, the guest simply clicks on an item in channel that has the "one-click" feature enabled, and a signal is sent to the hotel system to provide the guest with the selected item, without requiring any check-out procedures. For example, if the guest clicks on a food item in the room-service menu, the portable computer may send a signal to the hotel system including an identifier that identifies the guest's room and the selected item, and the hotel system instructs hotel staff to deliver the selected food item to the guest's room. Channels with this feature enabled may display a brief instructional bubble when first accessed by a guest during a session to warn the guest that clicking on at least certain items will cause those items to be directly purchased.

Groups of portable computers may also be defined and provided with related content. For example, a group may be defined that includes the portable computers from all the rooms of related guests; for example, guests that check-in together as a family, or guests that check-in under a particular group, such as for a wedding, conference or other event. Each portable computer associated with the group may be provided with synchronous or related content, or content that is responsive to an action taken by a guest using one of the group portable computers. For example, if a family or group of friends has booked two rooms and a guest in one room orders a spa treatment or in-room dining, the portable computer in the other guest's room may highlight spa treatment advertisements or the in-room service menu. For an event such as a wedding or conference, all portable computers in the rooms of guests associated with the event may be configured to display content related to the event, including advertisements or services that would typically be associated with the event or which are selected by other guests associated with the event. Thus, the promotional content offered to members of a group may be affected by or varied based on activity of other members of the group.

It is to be appreciated that although the above examples refer primarily to portable computers deployed within a hotel, similar features and functionality may be provided for any type of partner facility, not limited to hotels. For example, portable computers and systems related thereto may be provided in a wide variety of partner facilities, including cruise lines, taxi cabs, airlines, buses, trains, boats, hospitals, spas, retail stores, and other publicly accessible locations.

In one embodiment, the partner may create branded cards that provide access to content, including contextual advertizing and/or service offerings, that relate to a particular type of experience. For example, a partner may define a "family vacation" channel card that provides access to news and local information that would be most likely be of interest to guests on a family vacation, such as, for example, child-friendly local events and activities, along with targeted advertizing and/or promotions. Providing such cards may allow the partner to group content targeted to specific types of guests in a convenient, easy-to-access manner, without cluttering the home view.

As discussed above, the portable computer is highly reliant on access to the cloud and therefore may require a network connection to function as intended. Accordingly, as discussed above, partners provide network configurations as part of at least one configuration layer of each configuration they create, each one specifying one or more stored networks that the portable computers can connect to. This ensures that all a partner's portable computers will connect to a network automatically, and remain connected to the specified network, without requiring intervention by the guests. In some circumstances, a portable computer may lose the connection to the network. This could mean one of two things, namely that the network connection is temporarily unavailable due to a problem with the device itself, or a disruption of the network with which it is configured, or that the portable computer has been stolen or removed from the partner's chosen location. According to one embodiment, when a network connection is lost and none of the networks specified within the configuration connect successfully, a full-screen modal message appears on the portable computer display screen. This message may handle both of the above cases, as there will likely be no way to distinguish them. In one embodiment, the message takes over the entire screen and prevents any interaction with the portable computer until a network connection is reestablished. This prevents any unauthorized access on a stolen portable computer. The message may convey that the portable computer needs to be connected to the network provided by the partner, and optionally may display the partner's name and address, and provide instructions for contacting the appropriate parties to return the device or request technical assistance. Since there is significant variety in the type of action that is to be taken to request assistance, for example, requesting assistance may entail calling a helpline at a hotel, taking the portable computer to the IT department in a school or library, or simply passing the portable computer over the counter in a coffee shop, the assistance message/screen is configurable by the partner. The portable computer may continue to attempt to automatically reconnect to the network while this screen is displayed. In one example, feedback in the form of an asynchronous progress indicator is provided to let the guest know that the portable computer is trying to fix itself.

Thus, aspects and embodiments provide for portable computers, and networks incorporating portable computers specifically configured for transient, public use. As discussed above, integration with the Internet, the unique form factor and user interface, and dual active and passive modes of embodiments of the portable computer offer many benefits in public spaces, including significant passive functionality as well as secure, easy-to-use Internet access and web-focused operations for transient users. Partners have great flexibility in configuring portable computers, both individually and in groups, with specific functionality and targeted promotional content based on the location of the portable computer and information derivable or obtainable from the partner's existing computer system and/or the Internet. In addition, guests may be provided with a rich, rewarding and secure computing experience in that they are able to configure the user interface and access a wide variety of content without having to enter or store personal information on the portable computer. Promotional content and offered services are dynamically configurable and may be location-based, environment-based and/or guest status-based, as discussed above, thereby providing unique benefits and opportunities not available through conventional computing or personal electronics devices.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of configuring a portable computer for transient use by a plurality of guests at a selected location, the method comprising:

initiating a generic first session responsive to a first guest of the plurality of guests accessing the portable computer via a user interface of the portable computer;

creating a first guest profile and displaying a first selection of content in a default view arrangement on a display screen of the portable computer during the generic first session responsive to the generic first session being initiated;

responsive to the first guest electing a personalized home view arrangement during the generic first session, displaying a second selection of content on the display screen, the second selection of content comprising more available content than the first selection of content, wherein the second selection of content is composed of and arranged according to the personalized home view arrangement;

terminating the generic first session responsive to a termination action taken by the first guest or expiration of a time-out period;

erasing history of the generic first session on the portable computer responsive to termination of the generic first session; and redisplaying the first selection of content in the default view arrangement.

2. The method as claimed in claim 1, wherein displaying the first selection of content includes displaying a plurality of photographs associated with the selected location.

3. The method as claimed in claim 1, wherein displaying the first selection of content includes displaying information associated with the selected location.

4. The method as claimed in claim 3, wherein displaying the information includes displaying at least one of services available at the selected location, weather information associated with the selected location, and current events associated with the selected location.

5. The method as claimed in claim 1, wherein initiating the generic first session includes displaying a welcome screen containing information about the user interface of the portable computer.

6. The method as claimed in claim 1, wherein creating the first guest profile includes:
 accessing remote computer storage coupled to the portable computer via a network connection; and
 storing the guest profile on the remote computer storage.

7. The method as claimed in claim 1, further comprising erasing the first guest profile responsive to termination of the generic first session.

8. The method as claimed in claim 7, wherein erasing history of the generic first session further includes:
 clearing cookies and web history created during the generic first session; and
 resetting device configurations of the portable computer, including at least one of volume and screen brightness, to default settings.

9. The method as claimed in claim 1, wherein the second selection of content comprises a plurality of cards, each card configured to provide access to associated content.

10. A portable computer system configured for transient use by a plurality of guests, the portable computer system comprising:
 a portable computer having a display screen, a display manager, and user interface configured to accept inputs from the plurality of guests and to display content on the display screen; and
 remote computer storage coupled to the portable computer via a network connection;
 wherein the portable computer is configured to initiate a generic first session responsive to an input received from a first guest of the plurality of guests via the user interface and to store a first guest profile, wherein the first guest elects a personalized home view arrangement, on the remote computer storage, and to terminate the generic first session responsive to one of a termination action taken by the first guest and expiration of a time-out period, wherein terminating the generic first session includes erasing history of the generic first session on the portable computer; and
 wherein the display manager is configured to manage a plurality of views of computer content in the user interface, and to control the user interface to display a first selection of content in a default view arrangement on the display screen responsive to initiation of the generic first session and after termination of the generic first session, and to display a second selection of content on the display screen during the generic first session responsive to the first guest electing the personalized home view arrangement, the second selection of content comprising more available content than the first selection of content, wherein the second selection of content is composed of and arranged according to the personalized home view arrangement.

11. The portable computer system as claimed in claim 10, wherein the second selection of content comprises a plurality of cards, each card configured to provide access to associated content.

12. The portable computer system as claimed in claim 11, wherein the plurality of cards includes at least one web card that maps to a web page, and at least one channel card.

13. The portable computer system as claimed in claim 12, further comprising a communication component configured to access a web-based content; and
 wherein the display manager is configured to display the web-based content on the display screen responsive to guest selection of the at least one web card.

14. The portable computer system as claimed in claim 11, further comprising:
 an execution component configured to execute a first transformation from an unfocused view of a first card of the plurality of cards into a focused view of the first card responsive to computer focus on the first card; and
 wherein the execution component is further configured to execute a second transformation from the focused view of the first card into the unfocused view of the first card upon loss of computer focus on the first card.

15. The portable computer system as claimed in claim 14, wherein the focused view of the first card includes a header display and a body display, wherein the header display comprises at least one control displayed in the header display, and wherein the control is configured to execute computer-based functionality in response to execution by the first guest.

16. The portable computer system as claimed in claim 11, wherein the portable computer is located in a first location at a partner facility, and further comprising:
 at least one additional portable computer located in a second location at the partner facility; and
 a partner profile stored on the remote computer storage, the partner profile specifying a first configuration of the portable computer and a second configuration of the at least one additional portable computer.

17. The portable computer system as claimed in claim 16, wherein a first card of the plurality of cards is a branded card having a visual appearance corresponding to a brand of the partner facility.

18. The portable computer system as claimed in claim 17, wherein the branded card is configured such that it cannot be deleted by any guest of the plurality of guests.

19. The portable computer system as claimed in claim 17, wherein the visual appearance includes at least one of a color scheme and a logo.

20. A computer system configured for transient use by a plurality of guests at a selected facility, the computer system comprising:
 a plurality of portable computers including a first portable computer and a second portable computer, the first and second portable computers being located at different locations at the selected facility, and each portable computer including a network connection, a display screen, a display manager, and a user interface configured to receive inputs from the plurality of guests and to display digital content on the display screen; and computer storage separate from the plurality of portable computers and coupled to each of the plurality of portable computers via the respective network connection, the computer storage including a facility profile specifying a first content configuration for the first portable computer and a second content configuration for the second portable computer, the first and second content configurations being different;

wherein each portable computer is configured to initiate a generic first session responsive to an input received from a first guest of the plurality of guests via the user interface, wherein the first guest elects a personalized home view arrangement, and to terminate the generic first session responsive to one of a termination action taken by the first guest and expiration of a time-out period;

wherein the display manager is configured to manage a plurality of views of computer content in the user interface, and to control the user interface to display a first selection of content in a default view arrangement on the display screen responsive to initiation of the generic first session and after termination of the generic first session, and to display a second selection of content on the display screen during the generic first session responsive to the first guest electing the personalized home view arrangement, the second selection of content comprising more available content than the first selection of content; and wherein the second selection of content is composed of and arranged according to the personalized home view arrangement.

* * * * *